US010614216B2

(12) United States Patent
Srivastava et al.

(10) Patent No.: US 10,614,216 B2
(45) Date of Patent: Apr. 7, 2020

(54) PARAVIRTUALIZED SECURITY THREAT PROTECTION OF A COMPUTER-DRIVEN SYSTEM WITH NETWORKED DEVICES

(71) Applicant: Gigavation, Inc., Dallas, TX (US)

(72) Inventors: Gita Srivastava, Dallas, TX (US); Piyush B. Srivastava, Dallas, TX (US)

(73) Assignee: Gigavation, Inc., Dallas, TX (US)

( * ) Notice: Subject to any disclaimer, the term of this patent is extended or adjusted under 35 U.S.C. 154(b) by 837 days.

(21) Appl. No.: 15/099,160

(22) Filed: Apr. 14, 2016

(65) Prior Publication Data

US 2016/0306966 A1 Oct. 20, 2016

Related U.S. Application Data

(60) Provisional application No. 62/147,429, filed on Apr. 14, 2015.

(51) Int. Cl.
*G06F 21/55* (2013.01)
*G06F 21/31* (2013.01)
(Continued)

(52) U.S. Cl.
CPC .......... *G06F 21/554* (2013.01); *G06F 9/4555* (2013.01); *G06F 21/31* (2013.01);
(Continued)

(58) Field of Classification Search
CPC ........ G06F 21/53; G06F 21/31; G06F 21/554; G06F 9/4555; G06F 2009/45587;
(Continued)

(56) References Cited

U.S. PATENT DOCUMENTS 8,387,046 B1  2/2013  Montague et al. ............... 718/1
8,479,292 B1  7/2013  Linhardt ......................... 726/23
(Continued)

OTHER PUBLICATIONS

Authorized Officer: Chin, Sang Bum, Notification of Transmittal of the International Search Report and the Written Opinion of the International Searching Authority, or the Declaration, PCT/US2016/027575, 15 pages, dated Aug. 22, 2016.

*Primary Examiner* — Joseph P Hirl
*Assistant Examiner* — Thomas A Gyorfi
(74) *Attorney, Agent, or Firm* — Sunstein LLP

(57) ABSTRACT

A computer-implemented method and computer program product for protecting a computer-driven system from a security threat. The computer-driven system includes a processor host running an operating system in a virtualized environment in communication over a network with a plurality of electronic devices. A set of protocols governs communications over the network between the processor and the devices. The method includes receiving a driver call made to a specific driver, the driver call being generated by the operating system in response to a system call made by an application as well as interrupting transmission of the driver call to the specific driver; and performing a series of paravirtualization processes. The paravirtualization processes include: translating the driver call into a hyper call; analyzing the hyper call according to a set of security rules to determine if a security threat exists; if the analyzing does not determine that a security threat exists, then transmitting the hyper call to the specific driver; and if the analyzing determines that a security threat exists, then performing a security process.

15 Claims, 23 Drawing Sheets

(51) Int. Cl.
*H04L 9/32* (2006.01)
*H04L 29/06* (2006.01)
*H04L 9/30* (2006.01)
*G06F 21/53* (2013.01)
*G06F 9/455* (2018.01)

(52) U.S. Cl.
CPC ............... *G06F 21/53* (2013.01); *H04L 9/30* (2013.01); *H04L 9/32* (2013.01); *H04L 63/0435* (2013.01); *H04L 63/08* (2013.01); *G06F 2009/45587* (2013.01); *G06F 2221/034* (2013.01); *G06F 2221/2141* (2013.01)

(58) Field of Classification Search
CPC ....... G06F 2221/2141; G06F 2221/034; H04L 63/08; H04L 63/0435; H04L 9/30; H04L 9/32
See application file for complete search history.

(56) References Cited

U.S. PATENT DOCUMENTS

| | | | |
|---|---|---|---|
| 8,656,217 B2 | 2/2014 | Niesser | 714/11 |
| 2012/0255021 A1 | 10/2012 | Sallam | 726/25 |
| 2013/0111593 A1 | 5/2013 | Shankar et al. | 726/25 |
| 2013/0276056 A1* | 10/2013 | Epstein | G06F 21/604 726/1 |
| 2014/0173600 A1* | 6/2014 | Ramakrishnan Nair | G06F 9/461 718/1 |

* cited by examiner

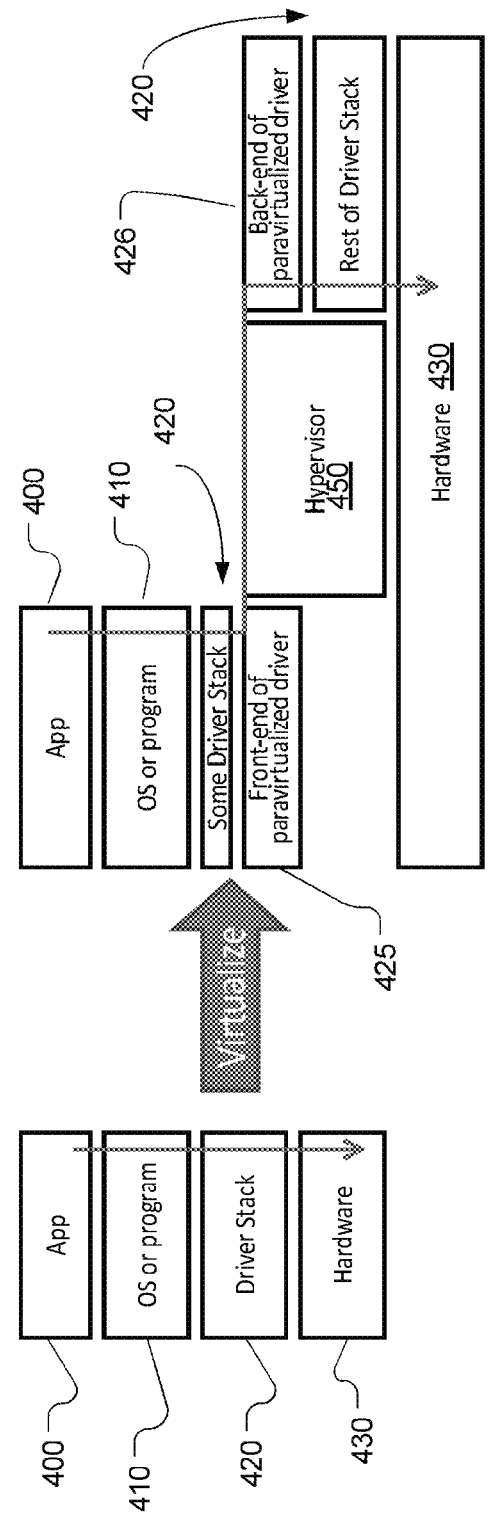

PARAVIRTUALIZED SECURITY THREAT PROTECTION OF A COMPUTER-DRIVEN SYSTEM WITH NETWORKED DEVICES

TECHNICAL FIELD

The present invention relates to security threat protection of networked devices and uncontrolled devices, and more particularly to security threat protection using a paravirtualized environment.

BACKGROUND ART

Low power processing cores, such as, ARM cores, now reside in a multitude of common devices, including cellular telephones, as well as, cameras, mobile devices, embedded systems, and within various components of complex systems, such as automobiles and household appliances. These processing cores are being connected together through different protocols, such as Universal Serial Bus ("USB"), Controller Area Network ("CAN"), Near Field Communications ("NFC") and Bluetooth. This has created a cyber-security problem at the interface level between hardware devices. Communication protocols such as Bluetooth and NFC have failed to incorporate adequate security, while others such as USB have been retrofitted with protocols developed for the desktop PC market, which only patch a minimal number of security holes at the application level and do not address hardware level communications.

In order to combat data security problems, the processor manufacturers have developed secure enclaves. For example, ARM Holdings' TrustZone and Intel's SGX technologies are designed to enable secure hardware enclaves, such that an application running in one of these enclaves cannot have its memory read or execution modified by any process outside of the enclave, including the operating system. Hardware enclaves prevent secured data from being compromised by malicious software, even if the infection spreads to the operating system. Secure enclaves represent only a first step into the security required for embedded and mobile systems. In addition to securing against these software attacks, one must consider the inputs/outputs from the CPU itself. To address such attacks, processor manufacturers could disable all CPU inputs/outputs; however this approach would result in an unacceptable loss of functionality.

Operating system ("OS")/driver level attacks have become easier with time as virtually all modern electronic devices now contain a full central processing unit ("CPU"). Therefore, designing an intelligent attack over a hardware protocol no longer requires custom designed hardware or even hardware expertise.

SUMMARY OF THE EMBODIMENTS

In accordance with one embodiment of the invention, a computer-implemented method of protecting, from a security threat, a computer-driven system is disclosed. The computer-driven system includes a processor host running an operating system in a virtualized environment in communication over a network with a plurality of electronic devices. The plurality of electronic devices communicates using a set of protocols over the network. The operating system receives a system call from an application. A driver call is generated by the operating system in response to this system call. Transmission of the driver call to the specific driver is interrupted and in a series of paravirtualized processes, the driver call is translated into a hyper call. The hyper call is analyzed according to a set of security rules to determine if a security threat exists. If the analysis does not determine that a security threat exists, the hyper call is transmitted to the specific driver. If the analyzing determines that a security threat exists, then a security process is performed. The security process may include precluding transmission of the hyper call to the specific driver. In other embodiments, the security process includes modifying the hyper call before transmitting the hyper call to the specific driver. In another embodiment of the invention, the security process includes generating a security threat notice.

In certain embodiments, the hyper call is analyzed and the system identifies that data is to be written to removable media and in response, the security process includes encrypting the data.

In another embodiment, the invention is implemented as a computer-implemented security system for use with a host processor having an operating system receiving a specific system call from an application. The security system includes an analysis module, coupled to a hypervisor and running on the host processor in a first virtualized environment separate from the operating system, the operating system running in a second virtualized environment. The analysis module includes an input for receiving, from a hypervisor, an input hyper call resulting from a driver call, made to a specific driver that has been received by the hypervisor, the driver call being generated by the operating system in response to a system call made by an application. The analysis module further includes computer code defining a computer process that analyzes the hyper call according to a set of security rules to determine if a security threat exists and the analysis module includes an output. The system also includes a security module, in the first virtualized environment, having an input coupled to the analysis module output and an output coupled to the hypervisor. The security module is configured to transmit the hyper call to the hypervisor to cause generation by the hypervisor of an output hyper call responsive to the input hyper call and directed to the specific driver if the analysis module does not determine that a security threat exists. If the analysis module determines that a security threat exists, the security module performs a security process. In one embodiment, the specific driver resides within the first virtualized environment. In other embodiments, the specific driver resides within a third virtualized environment.

In certain embodiments of the system, the input hyper call is identical to the output hyper call. Additionally, the security module may include storage of an encryption key and the security process involves encryption of data to be written to removable media. Embodiments of the invention may also be embodied as a computer program product implemented on a tangible computer readable medium having computer code thereon operational on a host processor for security analysis.

In other embodiments of the invention, the system provides a computer-implemented method of granting authorized user access to a set of files stored in an uncontrolled device while preventing unauthorized user access to such files even when the device is physically available to an unauthorized user. In such an embodiment, the set of files is stored in encrypted form. The method uses computer processes carried out by a processor in communication with the device. In the method, a potential user seeks access to the set of files. The computer processes comprise:

under conditions wherein:
(i) the files have been encrypted with a set of symmetric keys; and
(ii) there have been previously stored on the device, with the set of files, a set of instances of the set of symmetric keys, the set of instances constituting a heuristic access control list and heuristically defining a set of authorized users of the files, in that each distinct instance of the set of symmetric keys is encrypted with a public key of a corresponding subset of the set of authorized users;

accessing the potential user's private key;
determining whether the potential's user's private key can be used to decrypt one of the instances of the set of symmetric keys, and, if so, authenticating the potential user as one of the authorized users and decrypting the corresponding instance of the set of symmetric keys;
if the potential user has been authenticated as one of the authorized users, then using a member of the decrypted set of symmetric keys to decrypt at least one file of the set of files.

In certain embodiments of the invention, the computer processes further comprise providing a challenge to the potential user to determine if the potential user is one of the authorized users. In other embodiments, the processes occur under conditions wherein the heuristic access control list has been certified with a digital signature that has been stored on the device and the processes further comprise, evaluating the heuristic access control list for compliance with the digital signature to ascertain whether the heuristic access control list has been tampered with, and if the evaluating indicates that the heuristic access control list has been tampered with, then denying access to the potential user.

In other embodiments of the invention, the computer processes for the challenge includes at least one process selected from the group consisting of requiring a user to enter a user name and password, requiring a user that is a device to perform a function consistent with a characteristic of the device, evaluating behavior of a user that is a device for a pattern that is consistent with the nature of the device.

In certain embodiments of the invention, all of the files in the set of files are encrypted with one symmetric key. In another embodiment, each distinct file in the set of files is encrypted with a distinct symmetric key.

Embodiments of the invention may also include a computer-implemented method of granting authorized user access to write a set of files to be stored in encrypted form on an uncontrolled device, while preventing unauthorized user access to such files, even when the device becomes physically available to an unauthorized user. In this embodiment, the method uses computer processes carried out by a processor in communication with the device, and a potential user seeks access to write the set of files. The computer processes comprise:

under conditions wherein there has been stored on the device a set of instances of a set of symmetric keys, the set of instances constituting a heuristic access control list and heuristically defining a set of authorized users of the set of files to be stored on the device, in that each distinct instance of the set of symmetric keys is encrypted with a public key of a corresponding subset of the authorized users;

accessing the potential user's private key;
determining whether the potential's user's private key can be used to decrypt one of the instances of the set of symmetric keys, and, if so, authenticating the potential user as one of the authorized users and decrypting the corresponding instance of the set of symmetric keys;
if the potential user has been authenticated as one of the authorized users, then using a member of the decrypted set of symmetric keys to encrypt the set of files; and storing the encrypted set of files on the uncontrolled device.

In certain embodiments, the computer processes provide a challenge to the potential user to determine if the potential user is one of the authorized users.

In another embodiment of the invention, a nontransitory digital storage medium incorporated into an uncontrolled device is provided. The storage medium contains therein:
(i) a set of files in having been encrypted with a set of symmetric keys;
(ii) a set of instances of the set of symmetric keys, the set of instances constituting a heuristic access control list and heuristically defining a set of authorized user of the files, in that each distinct instance of the set of symmetric keys is encrypted with a public key of a corresponding subset of the set of authorized users;
so that wherein a potential user seeks access to the set of files, unauthorized user access to the set of files can be prevented and authorized user access to the set of files can be granted, by utilizing computer processes comprising:
accessing the potential user's private key;
determining whether the potential's user's private key can be used to decrypt one of the instances of the set of symmetric keys, and, if so, authenticating the potential user as one of the authorized users and decrypting the corresponding instance of the set of symmetric keys;
if the potential user has been authenticated as one of the authorized users, then using a member of the decrypted set of symmetric keys to decrypt at least one file of the set of files.

BRIEF DESCRIPTION OF THE DRAWINGS

The foregoing features of embodiments will be more readily understood by reference to the following detailed description, taken with reference to the accompanying drawings, in which:

FIGS. 4A and 4B schematically show respectively the communication path for a non-virtualized I/O driver call and for an I/O call using a hypervisor such as the Xen hypervisor, in accordance with embodiments of the present invention;

FIG. 7 is a schematic of an embodiment of the present invention applied to a computer system that has removable storage attached to the computer system through an I/O connection;

FIG. 8 is a flow chart of logical processes applicable to the embodiment shown in FIG. 7;

FIG. 9 shows of a paravirtualized security threat protection system, in accordance with an embodiment of the present invention, implemented in a medical device to protect the integrity of the device;

FIG. 10 is a flow chart of logical processes applicable to the embodiment of FIG. 9;

FIG. 11 shows a schematic of a paravirtualized security threat protection system, in accordance with an embodiment of the present invention, implemented in an automotive environment;

FIG. 12 shows a flow chart of logical processes applicable the embodiment of FIG. 11;

FIG. 15A establishes the provisioning of the heuristic access control list (HACL) in accordance with an embodiment of the invention;

FIG. 15B shows the communications between the policy module and the uncontrolled device (e.g. USB flash drive) once the certificate has been received by the policy module in accordance with one embodiment of the invention;

DETAILED DESCRIPTION OF SPECIFIC EMBODIMENTS

Figure 1:
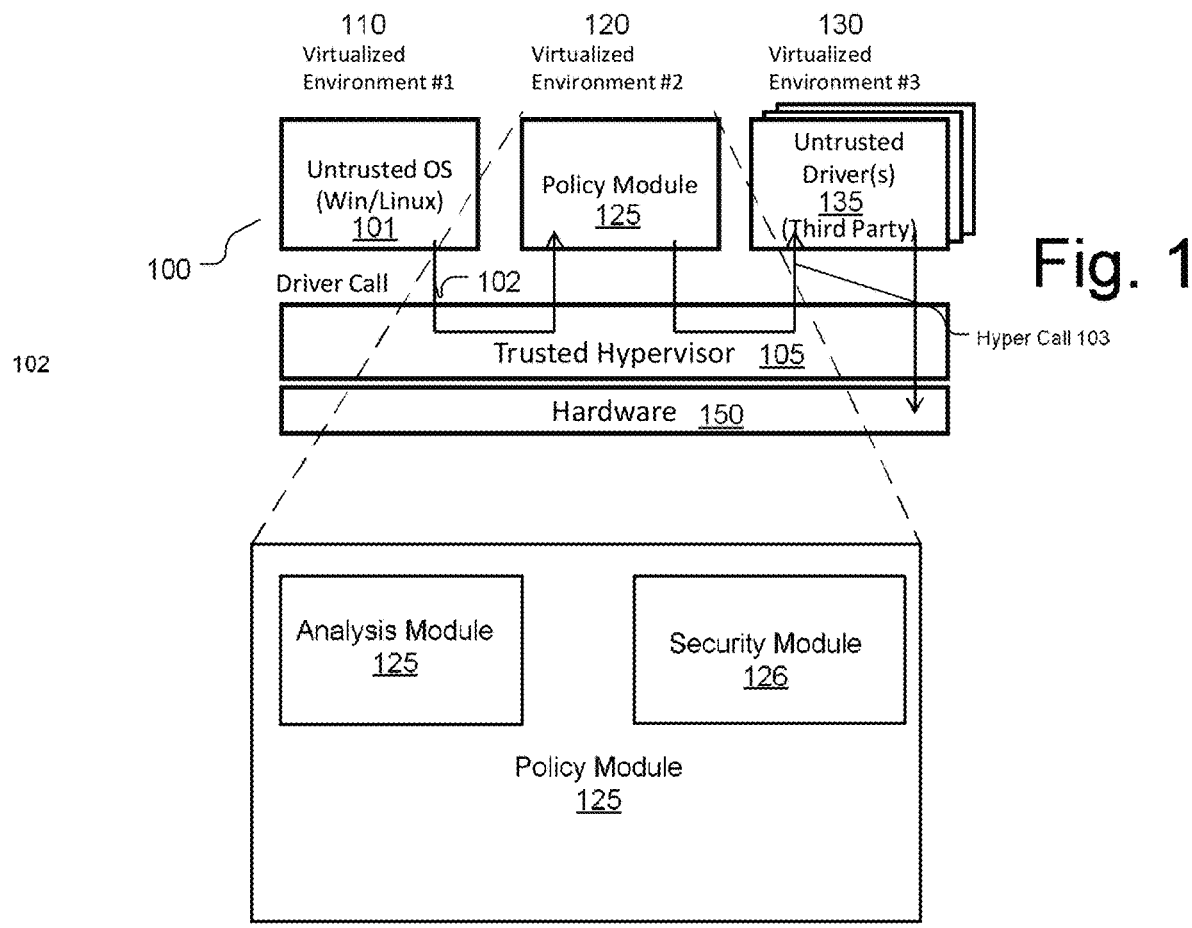
FIG. 1 is a schematic diagram showing the architecture for a paravirtualized security threat protection system in accordance with an embodiment of the present invention.

Definitions. As used in this description and the accompanying claims, the following terms shall have the meanings indicated, unless the context otherwise requires:

A "set" includes at least one member.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process", we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "driver" is a program that interfaces with a device and acts as a translator between the device and another program that uses the device. A "filter driver" built into a driver is included in the term "driver".

A "driver call" is a call to a driver, usually made by an operating system in response to a system call made by an application. A driver, may, but need not, be invoked in a number of different ways. For example, an external storage device can have a "read" functionality and a "write" functionality, wherein each functionality is invoked by a different driver call. A "driver call" does not necessarily have to go to the device with which the driver is associated, but can, for example, return data to the program that uses the device without communicating directly with the device.

A "hyper call" is a call to invoke functionality of a virtualized environment or of software supporting a virtualized environment. A "hyper call" can, but does not have to, jump to code in the hypervisor or in another virtual machine. For example, a hyper call may involve merely writing by a first virtual machine to memory shared with a second virtual machine, which polls the shared memory in timed intervals.

A "hypervisor" is software supporting a virtualized environment.

A "virtualized environment" is an environment selected from the group consisting of a virtual machine, a hypervisor, and combinations thereof in singular and plural.

"Paravirtualization" means translating a driver call into a hyper call and processing the hyper call according to a set of rules. Paravirtualization involves modifying the OS to replace nonvirtualizable instructions with hyper calls that communicate directly with the virtualization layer hypervisor. The hypervisor also provides hyper call interfaces for other OS operations such as memory management, interrupt handling and time keeping.

An "operating system" means a computer program handling basic input and output operations (such as driver calls) associated with operation of a computer, including a conventional operating system, or a guest operating system in a virtualized environment, or a program, in an embedded system or other environment, configured to handle basic input and output operations, even when not formally termed an "operating system" as such.

An "address" of a device is a set of information used to identify a device or one or more parts of a device. An address can be logical, physical, functional, temporary, ad hoc, dynamic, static, protocol-dependent, or not protocol-dependent.

A "Trusted Hardware Module" (THM) is a hardware-implemented or hardware-protected module that contains a "root of trust", upon which an operating system relies for implementation of some security functionalities. Examples of Trusted Hardware Modules are the ARM TrustZone, Intel SGX, and Trusted Platform Module (TPM).

A "user" may be a human requesting performance of an action or the user may be an entity, such as a processor, smartphone, or computer that is requesting performance of an action.

Embodiments of the present invention use a hypervisor based architecture to intercept and screen hardware requests for security threats. In traditional operating system environments, hardware drivers operate inside of the operating system kernel and interact directly with the hardware. Embodiments of the present invention decouple the driver from the host operating system and create a dedicated virtual environment in which the driver resides. Additionally, a policy module, which evaluates the hardware requests and implements a security policy, is also placed inside of a virtual environment. A software wrapper directs the driver call through the hypervisor to the policy module, which determines whether the driver call should be forwarded to the hardware. If it is determined, that the driver call should be forwarded to the hardware, the driver call is forwarded to the virtualized driver and the virtualized driver interacts with the hardware. Thus, the policy module provides a layer of indirection between the operating system and the driver. The policy module can then enforce security policies such as allowing/denying access to hardware resources, encrypting data prior to transmission, detection of attacks on driver (by in-situ measurement of driver), and other high-level behavioral enforcement algorithms. The policy module sits in the signal path between the OS and the driver/hardware. Therefore, untrusted information will be interrupted by the hypervisor and be directed to the policy module. One can ensure that neither the operating system, applications, nor the drivers can tamper or read the code/data stored by the policy module by employing enclave technology such as ARM TrustZone and Intel SGX as described above. A secured enclave provides a hardware barrier that prevents the untrusted operating system and the untrusted driver from accessing code/data of the policy module. Embodiments of the present invention include leveraging a Trusted Hardware Module ("THM"), defined above, to support functionalities such as authentication, anti-tampering, integrity checking, and platform attestation.

In one embodiment, since the driver lives within its own virtualized environment, the driver cannot be exploited to propagate out into the OS/application layer if the API between the operating system and the driver remains static (which is generally the case), the policy module can support multiple operating system versions and driver versions.

In embodiments of the invention, the policy module executes higher in the stack with respect to the driver. As a result, the policy module can support multiple protocols as well as driver upgrades. As long as the API between the operating system and the driver remains static, which is the case for some embodiments, the policy module can support multiple operating system versions and driver versions. In embodiments of the invention, the virtualized environment for the driver may be for the entire filesystem driver or for the block device. In a preferred embodiment, all functions attached to a given bus reside within in a single virtualized environment. For example, the USB driver stack up to and including the class drivers would be virtualized within a single environment. In such a configuration, higher-level drivers will be managed individually by the guest operating system(s).

The policy module may encompass a range of features that include for example: encryption, authentication, policy management, and verifying driver stack integrity, and leveraging industry standard key/certificate management. By isolating the driver from the operating system, any attacks that compromise the driver cannot migrate into the rest of the kernel.

Figure 1A:
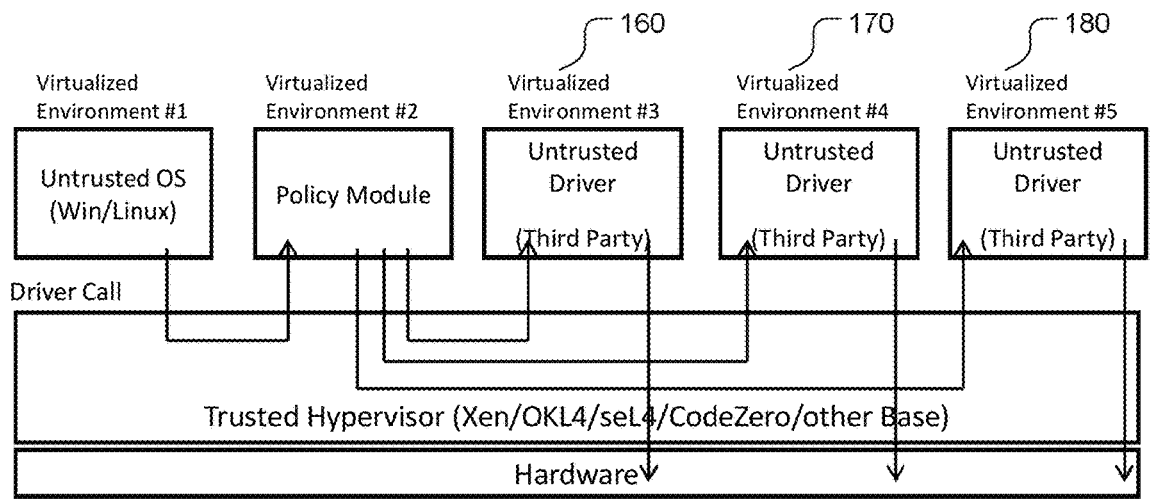
FIG. 1A shows an alternative embodiment in accordance with an embodiment of the present invention in which a plurality of untrusted drivers each reside within their own virtualized environment.
Figure 1B:
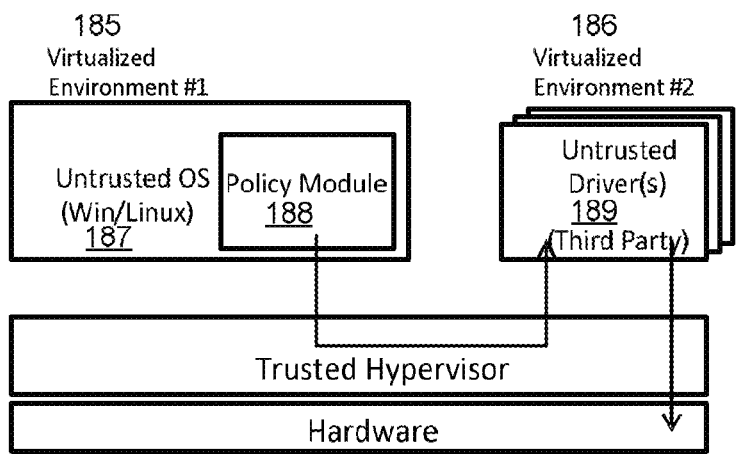
FIG. 1B shows an alternative embodiment in accordance with an embodiment of the present invention in which the policy module is located within the first virtualized environment and the untrusted drivers are located in the second virtualized environment.
Figure 1C:
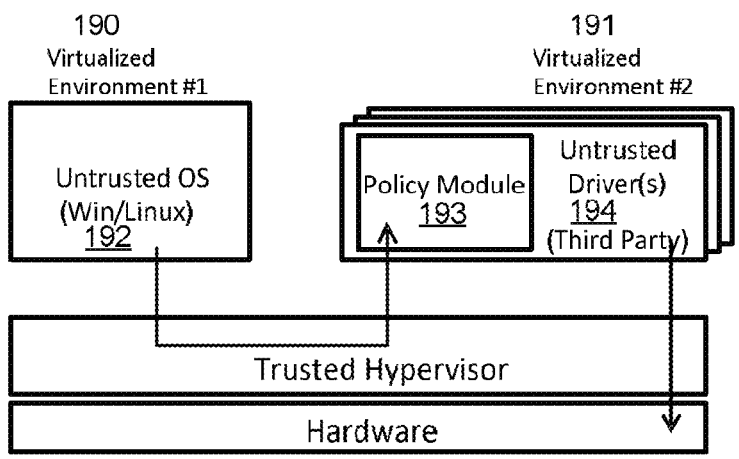
FIG. 1C shows an alternative embodiment in accordance with an embodiment of the present invention in which both the policy module and the untrusted drivers are located within the second virtualized environment.

FIG. 1 is a schematic diagram showing the architecture for a paravirtualized security threat protection system in accordance with an embodiment of the present invention. For purposes of security, the system assumes that the operating system and associated application programs on the host processor are not to be trusted. Similarly, the drivers provided by third parties are also not to be trusted. The architecture 100 decouples untrusted application programs, untrusted operating system 101 and resultant driver calls 102 from communicating directly with networked hardware devices 150. As would be understood by one of ordinary skill in the art, the host operating system that controls the host processor (not shown) is itself considered a virtualized environment 110. In this architecture, a hypervisor 105, which may be referred to as a virtual machine monitor, resides at a level below the host operating system 101. When an application makes a driver call 102 through the host operating system 101, the hypervisor 105 directs the driver call 102 as a hyper call 103 to a second virtualized environment 120 that includes a policy module 125. As shown in FIG. 1 the policy module includes two sub-modules: an analysis module 126 and a security module 127. The hyper call 103 is analyzed in the policy module's analysis module to determine if the hyper call 103 complies with a set of rules as defined within the analysis module. If the analysis module determines that the hyper call 103 is not a threat, the hyper call 103 is directed to the security module that will release the hyper call to the hypervisor 105. The hypervisor will provide the call to a third virtualized environment 130 that includes the untrusted driver 135. The untrusted driver 135 will then translate the hyper call and the driver 135 will communicate with the hardware device 150 associated with the driver call 102. If the analysis module identifies the hyper call 103 as a security threat, the analysis module will indicate that the hyper call is a security threat to the security module and the security module will determine how to respond to the security threat. The security module may send a return signal back to the application program indicating that the requested communication is not allowed and may further indicate to the application that there is an error, or may take no further action. As shown in FIG. 1, each untrusted driver resides in a single virtualized environment 130. FIG. 1A shows an alternative embodiment in which a plurality of untrusted drivers each reside within their own virtualized environment (160, 170, 180). FIG. 1B shows an alternative embodiment in accordance with an embodiment of the present invention in which the policy module 188 is located within the first virtualized environment 185 and the untrusted drivers 189 are located in the second virtualized environment 189. In this configuration, the policy module 188 resides within the untrusted OS 187. FIG. 1C shows an alternative embodiment in accordance with an embodiment of the present invention in which both the policy module 193 and the untrusted drivers 194 are located within the second virtualized environment 191. In this embodiment, the untrusted operating system 192 is located within the first virtualized environment 190.

Figure 2:
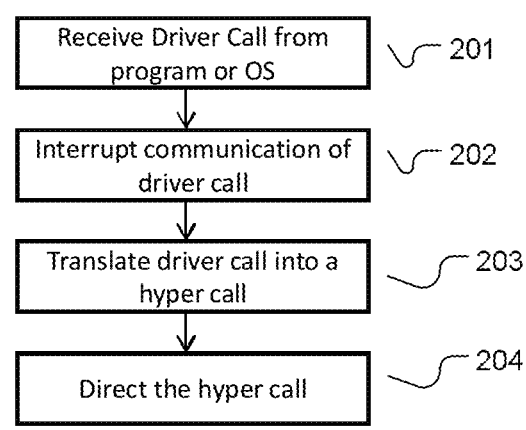
FIG. 2 shows a flow chart of the method steps for security threat protection in a computer system that is in communication with one or more networked devices in accordance with an embodiment of the present invention.

FIG. 2 shows a flow chart of the method steps for security threat protection in a computer system that is in communication with one or more networked devices in accordance with an embodiment of the present invention. First, a driver call is received from the program or from the operating system 201. Communication of the driver call is interrupted 202. The communication may be interrupted by any known method. For example, a front-end driver may intercept the driver call and the driver call may be translated into a hyper call for transmission through the hypervisor. In another embodiment, the driver call is intercepted by the hypervisor and the hypervisor converts the driver call into a hyper call 203. Once the driver call is translated into the hyper call, the hyper call is directed to its destination 204. The destination will be within a virtualized environment. Preferably, the hyper call will be directed to the virtualized environment that includes the policy module having analysis and security submodules.

Figure 3:
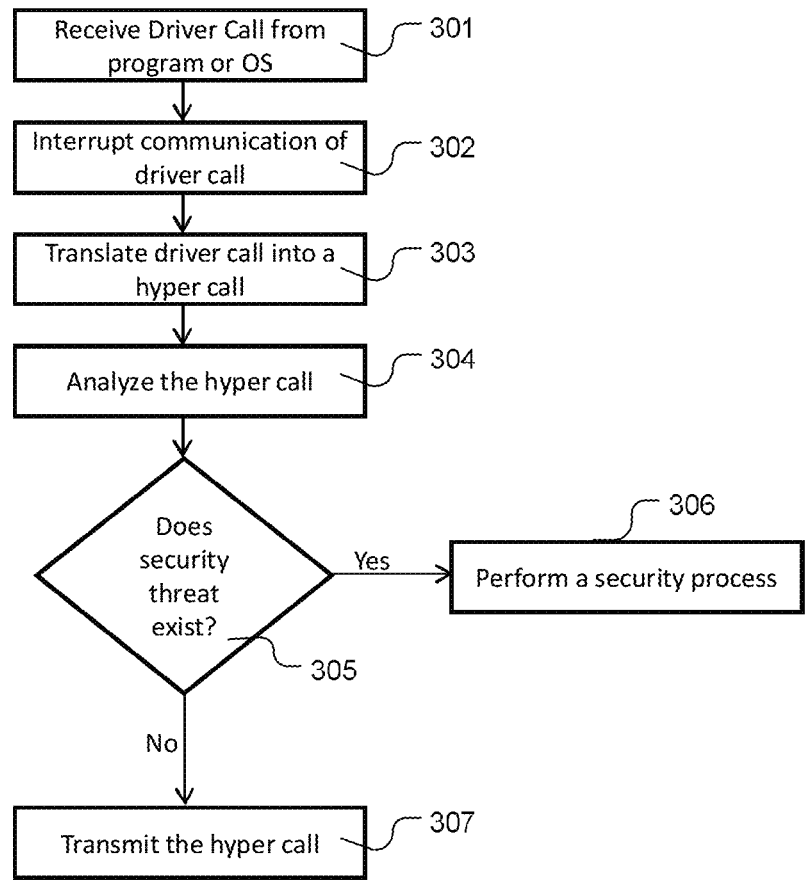
FIG. 3 is another flow chart of a method for security threat protection using a paravirtualized environment in accordance with an embodiment of the present invention.

FIG. 3 is another flow chart of a method for security threat protection using a paravirtualized environment in accordance with an embodiment of the present invention. As shown in FIG. 3, a driver call is received by the system from either an application program through the operating system of the host processor or from the operating system of the host processor directly 301. As before, the communication of the driver call is interrupted by the system 302. The driver call may be interrupted by the hypervisor in some embodiments. The driver call is translated into a hyper call by the hypervisor or a front-end paravirtualized driver 303. The hyper call is then analyzed in a policy module, which resides in a virtualized environment 304. The policy module first determines whether a security threat exists 305. If a security threat exists, a security process is performed based upon the security threat 306. If a security threat is not determined to exist, the hyper call is transmitted 307. Preferably, the hyper call would be transmitted by the hypervisor to a virtualized environment that includes the virtualized device driver. The virtualized device driver would then communicate with the hypervisor, which would directly communicate with the hardware.

It should be understood by one of ordinary skill in the art that there are different hypervisor environments that each function in slightly different ways to provide virtualization and paravirtualization and the present invention is not limited to a single hypervisor environment. For example, there are hypervisors that are deployed as bare-metal installations. Other hypervisors are considered hosted hypervisors where the software is not installed onto the bare-metal, but resides on top of an already live operating system.

Additionally, there are variations within the hosted hypervisors with different hypervisors being developed by different companies for different environments. For example, Microsoft provides the Hyper-V hypervisor for Windows, VMware's vSphere provides software virtualization for integration with storage area network, local area networks and wide area networks. Xen is an open sourced Linux-based hosted hypervisor. The present invention as claimed is not limited to a specific hosted hypervisor environment, but will be explained through examples with respect to the Xen hypervisor.

Xen uses an indirect driver design that routes virtual machine input/output ("I/O") through device drivers in the operating systems (e.g. Windows or Linux). Xen uses an indirect split driver model consisting of a front-end driver running in a first virtual domain and the back-end driver running in a second virtual domain. These two drivers interact with each other via a block of shared memory. The front-end driver manages the I/O requests of the guest OS and the back-end driver is responsible for managing the real I/O devices and multiplexing the I/O data of different machines. The back-end drivers may be standardized and have the same format as a typical hardware driver. Thus, the back-end driver would not require any customization in the proposed implementations from the driver that would be provided by the third party hardware manufacturer of the networked hardware devices.

Figure 3A:
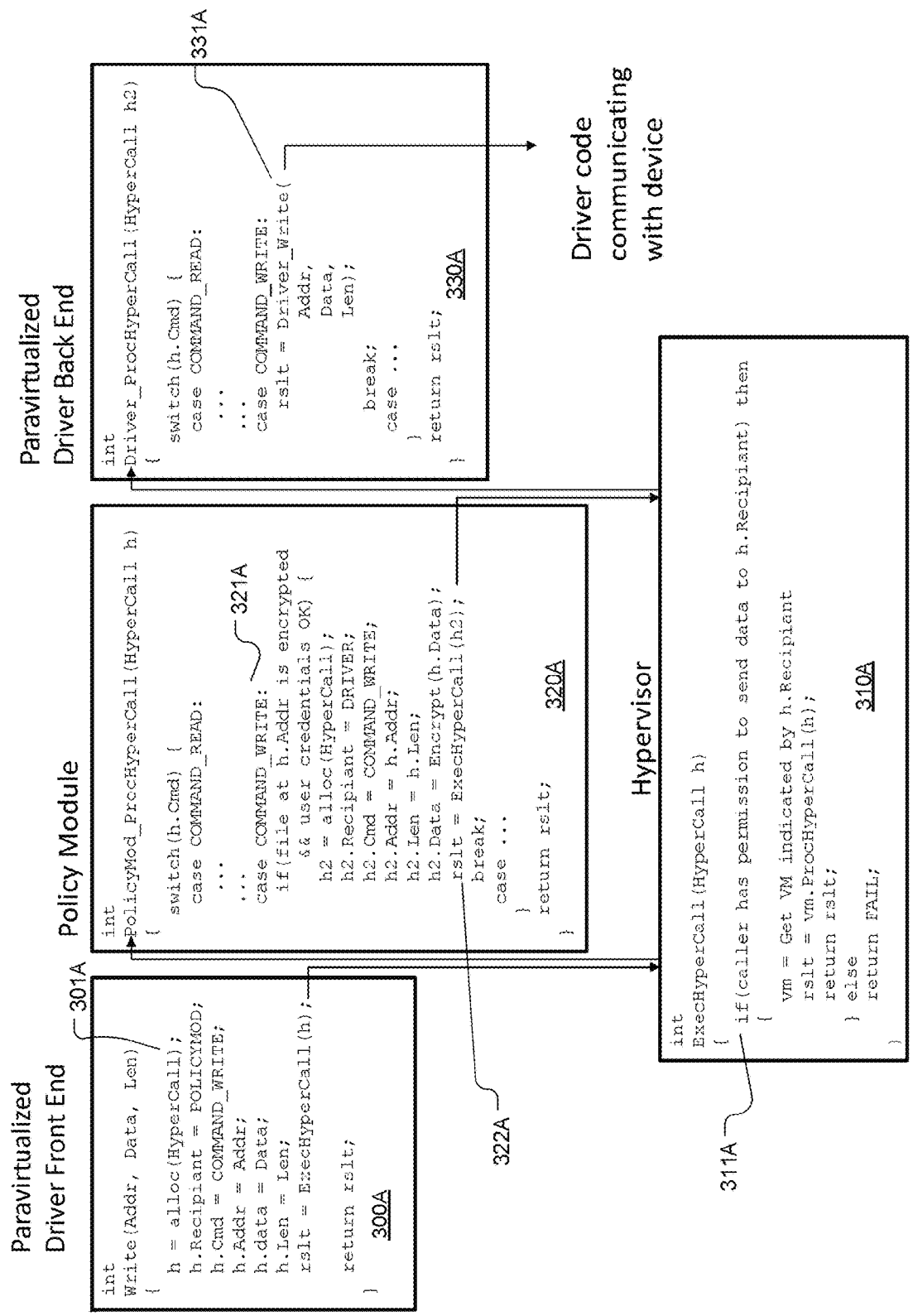
FIG. 3A is exemplary pseudo computer code showing the relationships between the paravirtualized driver front end, a hypervisor, a policy module, and the paravirtualized driver back-end in accordance with one embodiment of the invention.

FIG. 3A is exemplary pseudo computer code showing the relationships between the paravirtualized driver front end 300A, the hypervisor 310A, the policy module 320A and the paravirtualized driver back-end 330A in one embodiment of the invention. The paravirtualized driver front end 300A receives a write request and allocates memory for a hyper call 301A. The code of the paravirtualized driver creates a hyper call (ExecHyperCall (h)) that accesses the ExecHyperCall function in the Hypervisor. This code determines if the caller has permission to send data to h.Recipient 311A, which is the policy module, and if so, a hyper call is directed to the policy module (e.g. reslt=vm.ProcHyperCall(h);). The policy module receives this hyper call. In this example, the policy module may receive a request for either reading or writing data. Since the hyper call originated as a write request to the paravirtualized driver front end, the code (case COMMAND_WRITE 321A) is evaluated. The file at h.Addr is evaluated to see if it is encrypted and the requesting user's credentials are authorized. Assuming that the file is encrypted and the credentials are authorized, a hyper call "h2" 322A is directed to the hypervisor. The hypervisor as before accesses ExecHyperCall and the result directs the hyper call h2 to the paravirtualized driver back-end 331A. The paravirtualized driver back-end then executes case COMMAND_WRITE: wherein the returned result is a driver write command (rslt=Driver Write( ) that communicates with the device.

It should be clear to one of ordinary skill in the art that communications may originate in either direction. Thus, communications can originate from an application within the host operating system into the paravirtualized front-end driver through to the device or a communication can originate from a networked attached device through the paravirtualized driver back-end to the host operating system and application.

FIGS. 4A and 4B schematically show respectively the communication path for a non-virtualized I/O driver call and for an I/O call using a hypervisor such as the Xen hypervisor, in accordance with embodiments of the present invention. As shown in FIG. 4A in the non-virtualized environment, an application 400 makes in I/O call to an operating system or embedded program that functions as an operating system 410. The operating system selects the appropriate driver and places the driver into the driver stack 420. The driver stack includes the overall sequence of drivers that participate in an I/O request. In a standard non-virtualized environment the drivers and the driver stack resides within the operating system. The driver stack translates the I/O request from the application and provides the request to the hardware 430 using the appropriate protocol for the hardware 430.

As shown in FIG. 4B, a virtual machine manager 450 (i.e. a hypervisor is inserted between the hardware 430 and the driver stack 420. Additionally, the paravirtualized driver includes both a front-end driver 425 and a back-end driver 426. The application makes a call to access or communicate with hardware 430 that is networked with the host processor. The I/O call is directed to the operating system 410 and then through the driver stack 420 to the front end of the paravirtualized driver 425 that intercepts the driver call and the driver call is converted into a hyper call. The hypervisor 450 directs the hyper call to the back-end of the paravirtualized driver 426 and the back-end driver communicates through the rest of the driver stack to hardware device 430 using the protocol of the hardware device.

Figure 5:
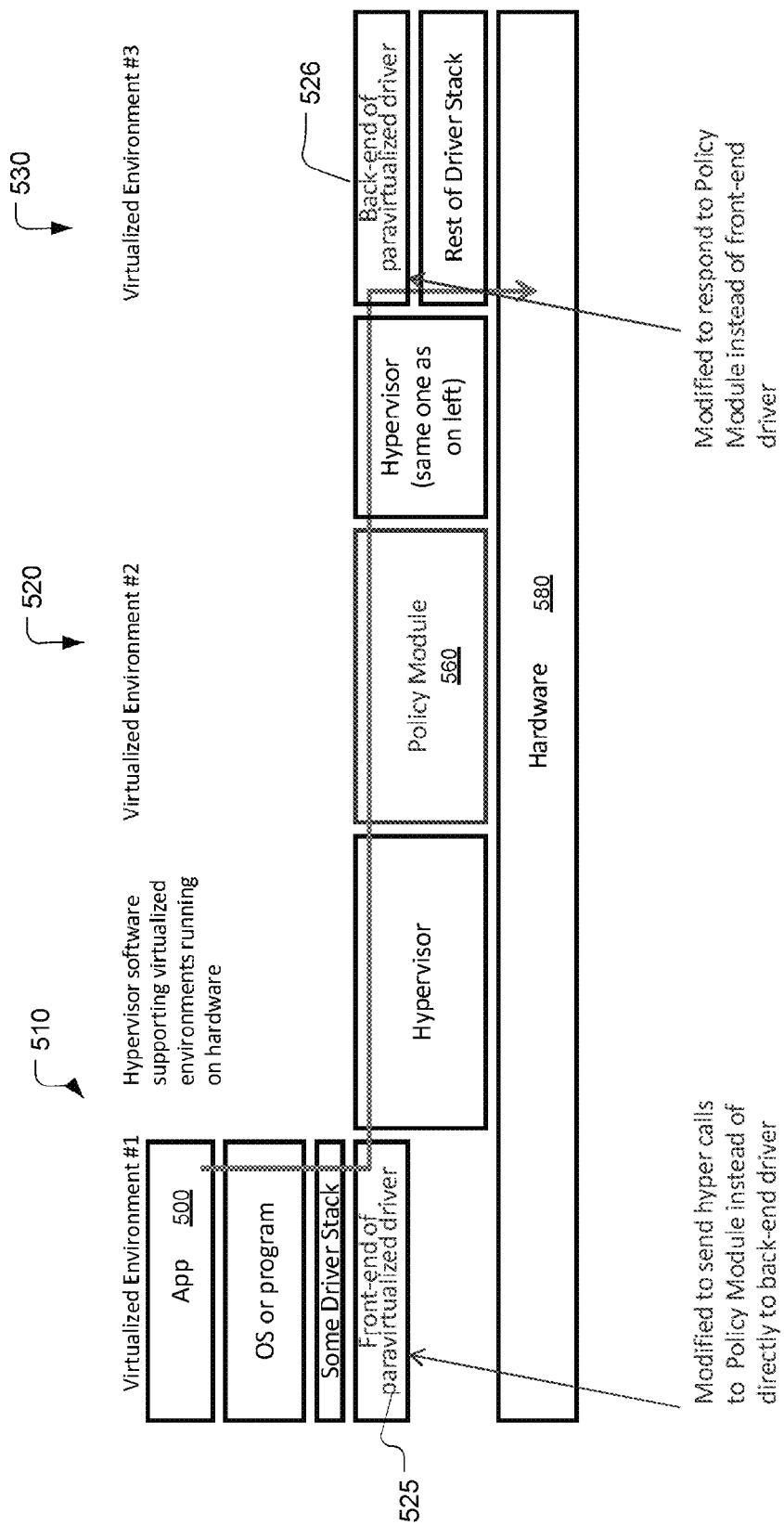
FIG. 5 shows a communication path, in accordance with an embodiment of the present invention, between an application and a networked hardware device wherein a policy module resides within a virtualized environment and determines if a security threat occurs as the result of an I/O communication with a networked hardware device.

FIG. 5 shows a communication path, in accordance with an embodiment of the present invention, between an application and a networked hardware device wherein a policy module resides within a virtualized environment and determines if a security threat occurs as the result of an I/O communication with a networked hardware device. FIG. 5 differs from the FIG. 4B in that there are three separate virtualized environments (510, 520, and 530) and driver calls are directed through a policy module 560 within the second virtualized environment 520. In order for the driver call to be directed to the policy module 560, the front-end paravirtualized driver 525 is modified so that the driver sends hyper calls to the policy module 560 instead of directly to the back-end of the paravirtualized driver 526.

Figure 6:
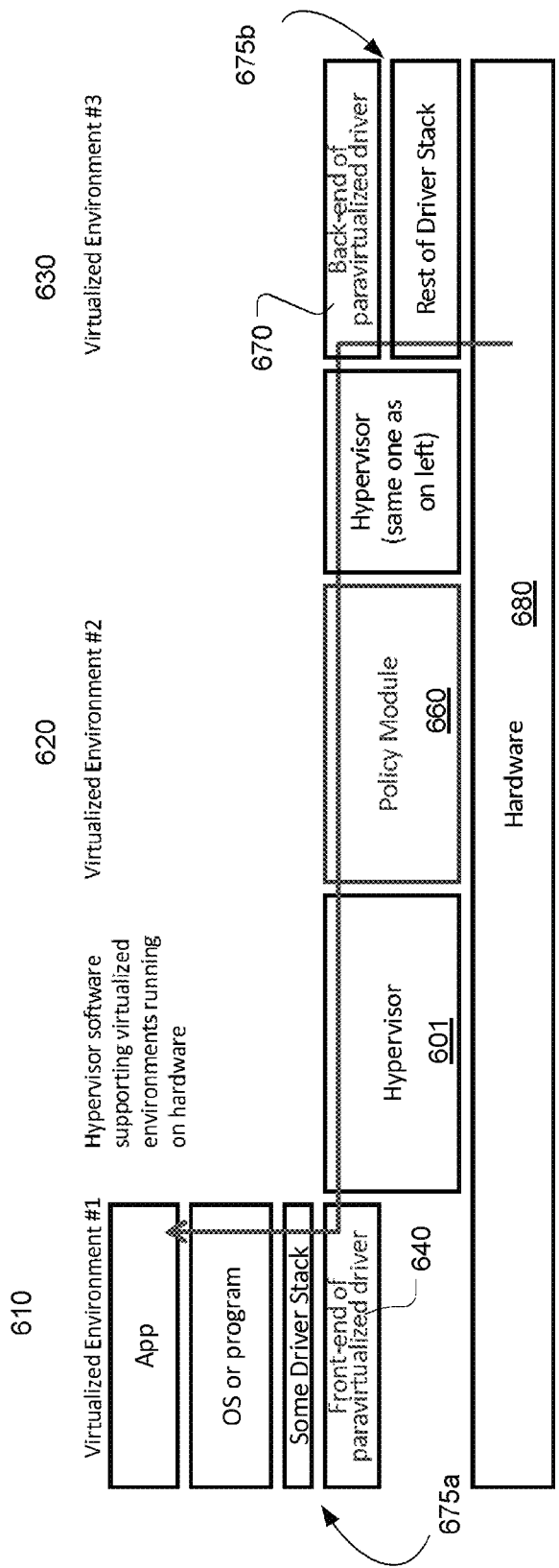
FIG. 6 shows a communication path, in accordance with an embodiment of the present invention, originating at the networked hardware device.

FIG. 6 shows a communication path, in accordance with an embodiment of the present invention, originating at the networked hardware device. In such an embodiment, a networked hardware device 680 generates a communication to an application 600 on the host processor, such as an interrupt. The communication may include the transfer of data from the networked hardware device back to the operating system or to the application 600. In FIG. 6, communication is directed from the hardware-networked device 680 through the driver stack 675a,b (Some Driver Stack 675a and Rest of Driver Stack 675b) to the back-end of the paravirtualized driver 670 that resides within the third virtualized environment 630. Depending on the embodiment, the relationship between Some Driver Stack 675a and Rest of Driver Stack 675b may vary over time, may overlap, and/or may contain different code. Such variations may depend on the driver call and/or state of the machine. The driver stacks in other examples may also vary of time such as in the embodiments described by and shown in FIG. 5 and FIG. 4B. The back-end of the paravirtualized driver 670 uses the hypervisor 601 to forward a hyper call to the policy module 660 in the second virtualized environment 630. The policy module 660 determines if the hyper call is a security threat and if it is determined that the hyper call does not result in a security threat, the hyper call is forwarded through the hypervisor 601 from the second virtual environment 620 to the front end paravirtualized driver 640 within the first virtual environment 610. The front-end paravirtualized driver 640 executes a call back function based on the type of interrupts that is received within the hyper call. For certain interrupts, the call back function does not push data back to the operating system or the application. For example, if the interrupt only affects the internal state of the driver and is not relevant to the application or the operating system no data needs to be passed to the operating system or the application. In other embodiments, the call back function pushes data to the operating system of the host processor and may also push the data back to the application.

FIGS. 7-12 show embodiments of the invention, used in different contexts and environment, to illustrate analysis and security functions performed by the policy module.

Figure 7:
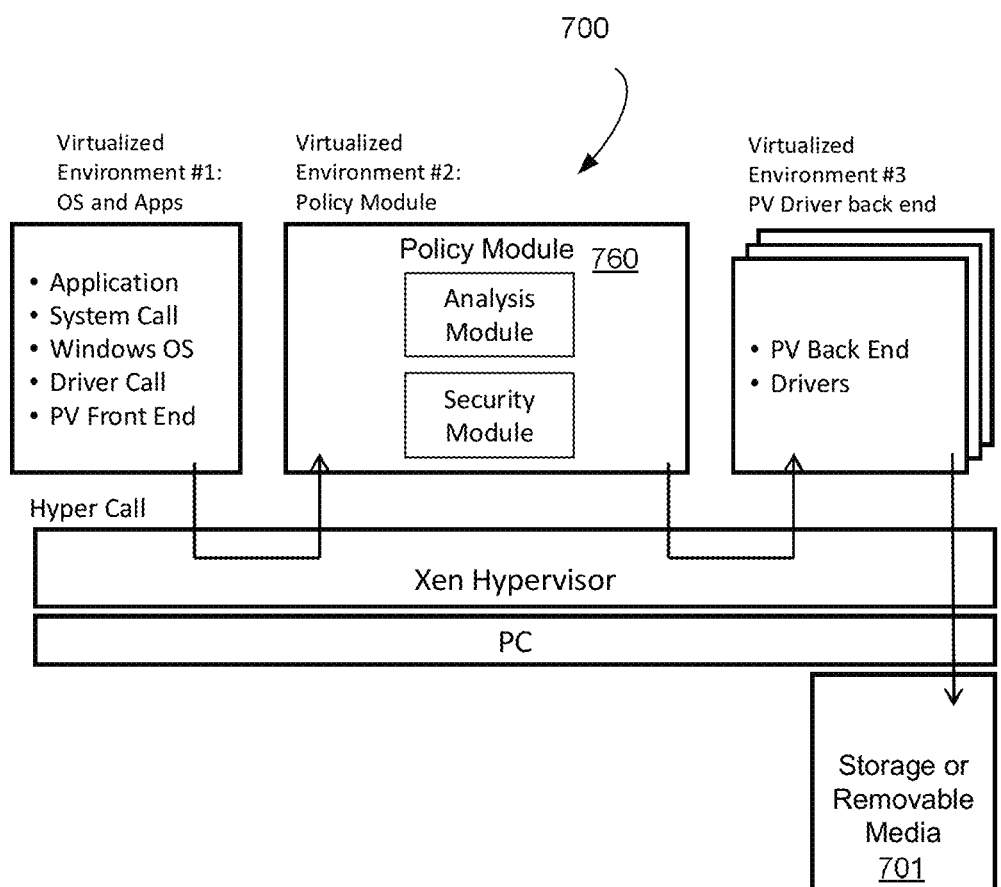
FIGS. 7-12 show embodiments of the invention, used in different contexts and environment, to illustrate analysis and security functions performed by the policy module.
Figure 8:
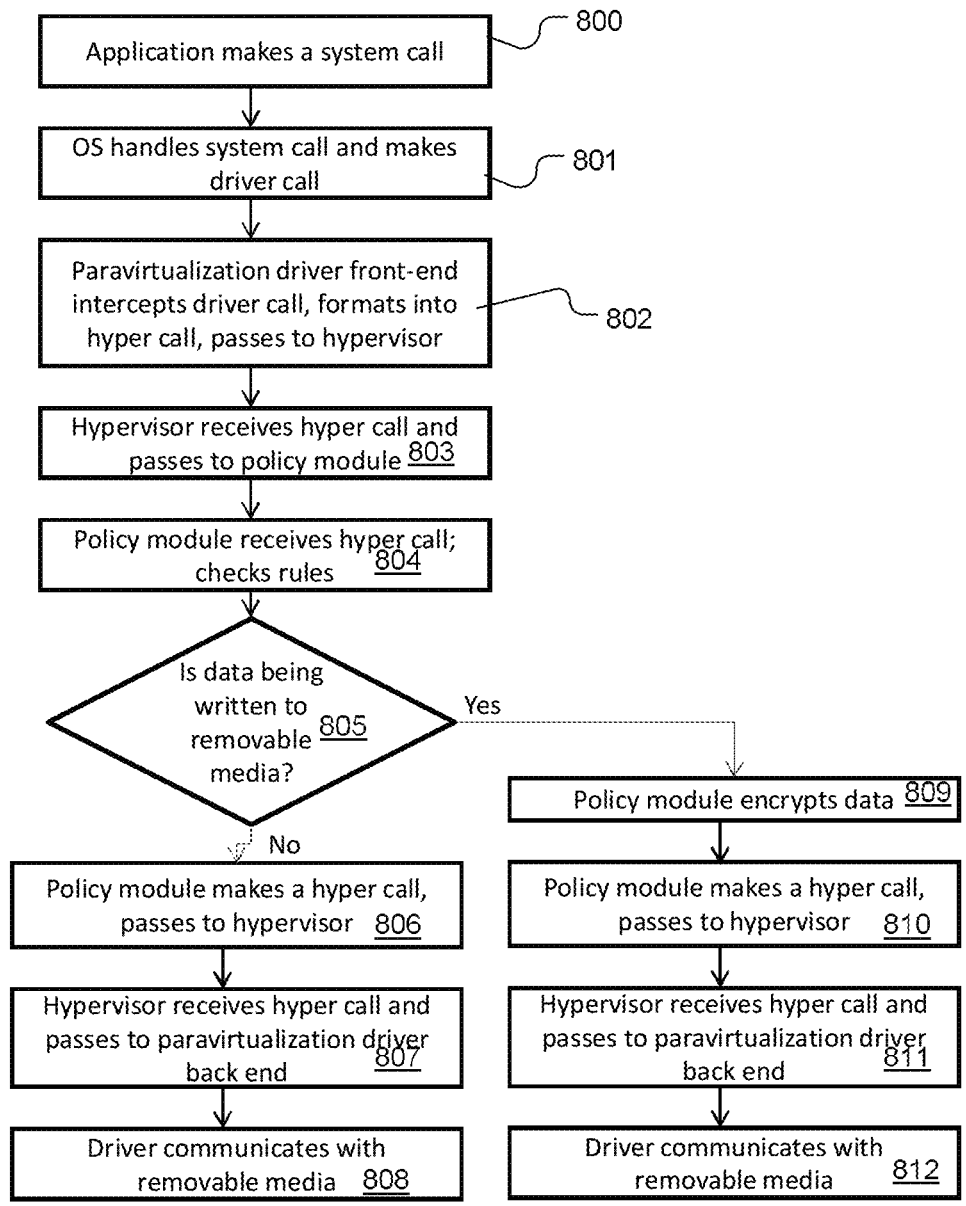

FIG. 7 is a schematic of an embodiment of the present invention applied to a computer system that has removable storage attached to the computer system through an I/O connection. FIG. 8 is a flow chart of logical processes applicable to the embodiment shown in FIG. 7. As shown, the removable hardware storage device 701 may be a flash device that is connected to the computer system 700 through a USB connection USB bus protocol. In this example, the policy module 760 has been configured such that all data removed from the computer system on either removable media or storage is encrypted. A user of the computer system may make a request to store a document operating within an application on the removable storage media. The application makes a system call to the OS (801). The OS handles the system call and makes the driver call (802). The data from the document is passed to the driver stack to be written to the storage media. The paravirtualized driver front end intercepts this driver call, formats the driver call into a hyper call, and passes the hyper call to the hypervisor (803). The hypervisor receives this hyper call and passes the hyper call to the policy module in a separate virtual environment from the OS (804). The policy module would include within the analysis module a set of instructions to check if a write request has been made to removable media or storage (805). If the answer is no that a write request has not been made, the policy module makes a hyper call and passes the hyper call to the hypervisor (806). The hypervisor receives the hyper call and passes the hyper call to the paravirtualized driver back-end (807). The driver then communicates with the removable media (808). For example, the application may have simply made a read request from the removable media.

The analysis module may also include an authentication check to identify if the party making the request has the authorization to copy data from the computer. For example, the user's credentials and permissions can be derived from a directory service such as Microsoft's Active Directory if the operating system is Microsoft Windows. The security module encrypts the data with a locally resident key (e.g. inside the policy module) (809) and creates a new hyper call to a paravirtualized driver back end in a third virtual environment (separate from the OS and the policy module's virtual environments) (810). This second hyper call is sent to the hypervisor. The hypervisor passes this second hyper call to the virtual machine containing the paravirtualized driver back-end (811). The back-end driver processes the call by communicating with the removable media (812). By having the key management and key storage in a separate location than the OS, device, and driver, security is enhanced. This configuration is more secure because none of the untrusted software or hardware (i.e. the OS, the untrusted device, or the untrusted drivers) has access to the key management or key storage.

Figure 9:
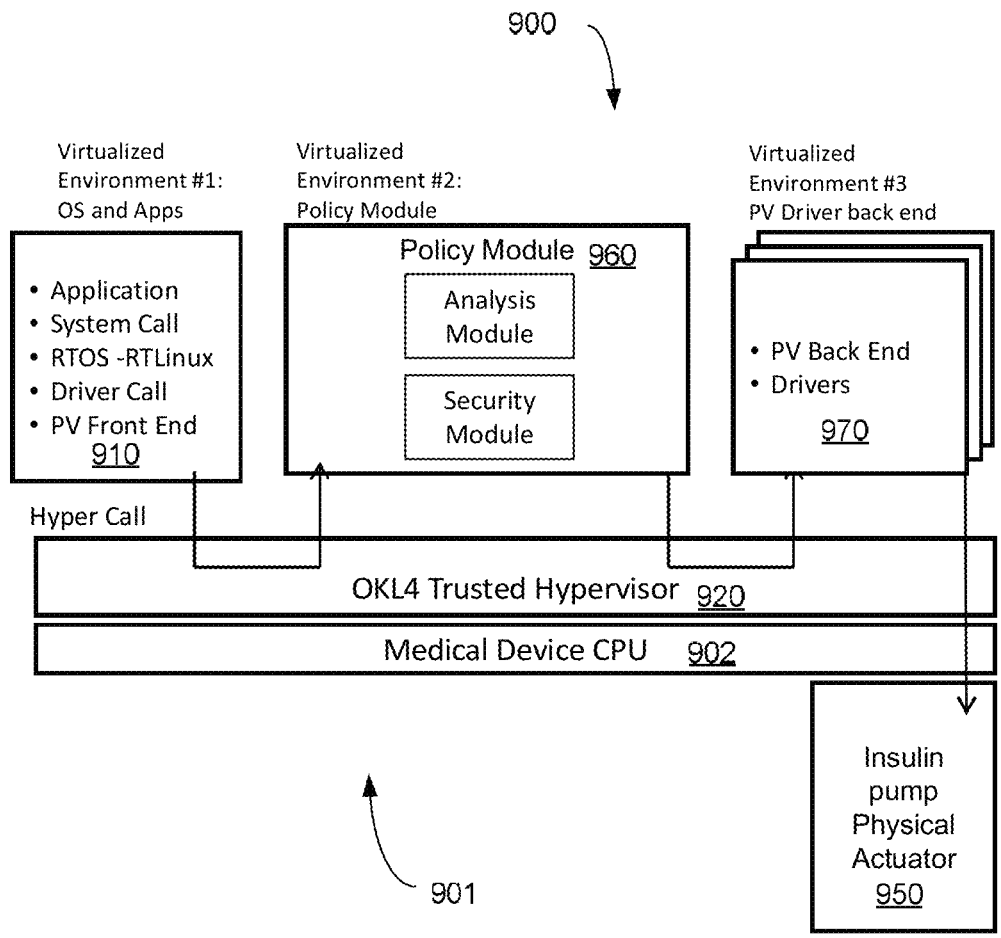
Figure 10:
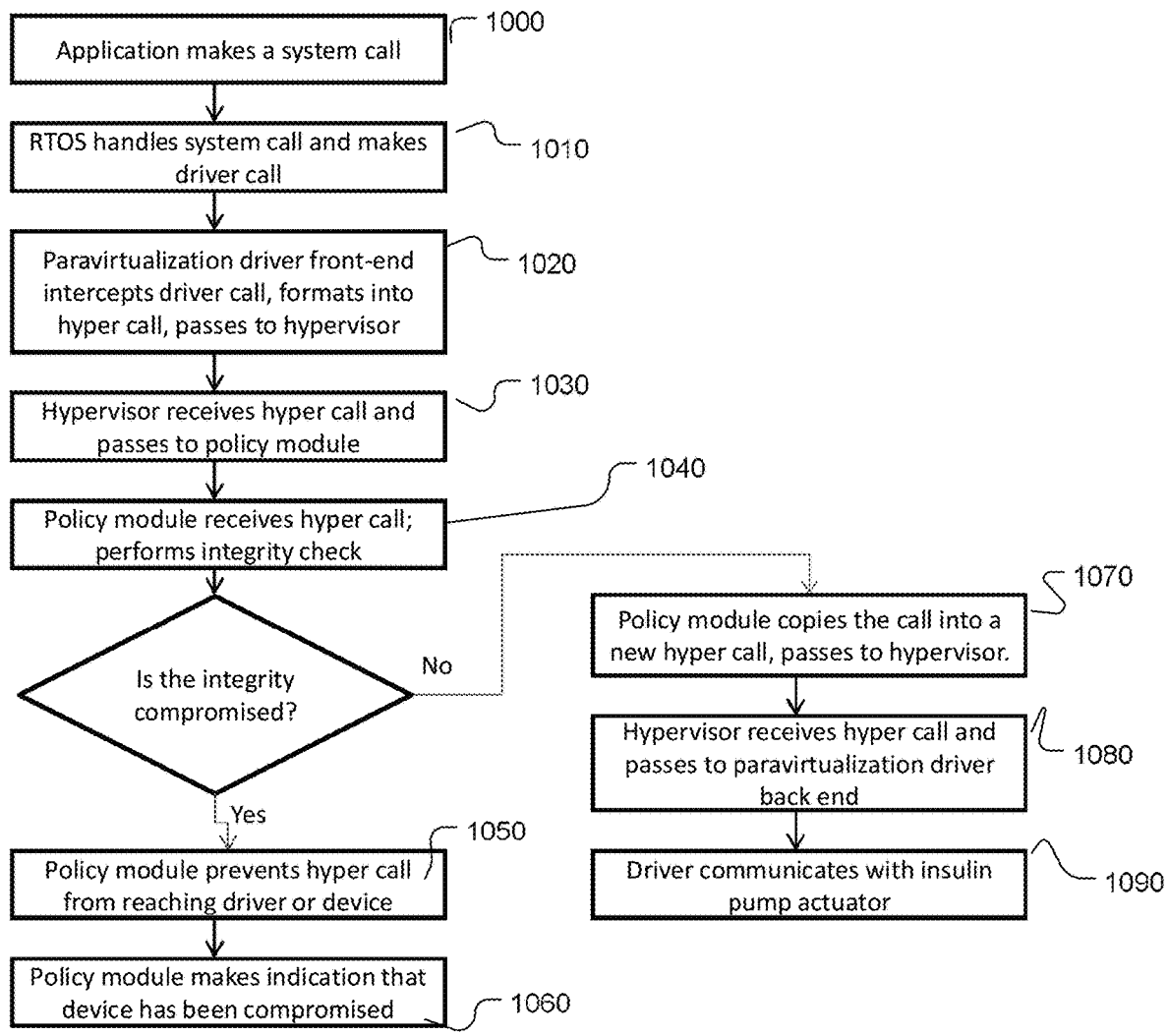

FIG. 9 shows a paravirtualized security threat protection system, in accordance with an embodiment of the present invention, implemented in a medical device to protect the integrity of the device. FIG. 10 is a flow chart of logical processes, including security processes 1050 and 1060, applicable to the embodiment of FIG. 9. A medical device 901 such as an insulin pump may have a central processing unit 902 running software that manages physical actuators 950 and simultaneously connects to the internet or other network for centralized management and data collection. The security system when embodied in such a medical device can prevent a malicious actor from taking control of the medical device and causing harm to the patient that is using the device. In an embodiment, the untrusted OS may be an embedded OS such as RTLinux, VxWorks, SYS/BIOS or some other real-time operating system (RTOS) 910. The application running on top of the RTOS would make a request to activate the insulin pump's actuator (1000). The RTOS handles the system call and makes a driver call (1010) This request would be sent to the driver stack, where it would be intercepted by the paravirtualized driver front end, and converted into a hyper call (1020). This hyper call is passed to the hypervisor 920 and the hypervisor passes the hyper call to the policy module 960 in a separate virtual environment from the OS (1030). The analysis module within the policy module may conduct an integrity check on the untrusted OS to determine if its code has been modified (e.g. by a malicious actor) (1040). The results of this integrity check are passed to the security module. If the OS's integrity has been compromised, the security module may prevent the hyper call from reaching the driver (and insulin pump device, subsequently) (security process 1050). It may also make an indication that the device has been compromised (security process 1060). For example, a signal may be generated and sent to the host processor, which will signal an alarm. The alarm may be visual, auditory or both.

If the security module determines that the OS's integrity check was successful, it copies the call into a new hyper call and passes it to the hypervisor (1070). The hypervisor passes this hyper call to the paravirtualized driver back-end 970 in a third virtualized environment separate from the OS and policy module (1080). This paravirtualized driver back-end processes the call by communicating with the insulin pump actuator (1090).

In this example, the insulin pump OS, applications running on the insulin pump, and even drivers may contain a significant amount of code and provide I/O connections over a number of pathways (busses, wireless links, etc.) using a number of different and varied protocols. This exposes a very large threat surface. However, the policy module has a very small threat surface because it is small compared to the OS and application, since the functions are confined to integrity checking or testing the insulin pump software and passing commands, and because there are no interfaces to communicate with the policy module for the malicious actor to hack. Therefore, since the policy module protects the insulin pump OS, applications, and drivers, the security of the entire system is increased because the threat surface is reduced. If a malicious actor hacks the insulin pump software, the policy module can stop operation of the insulin pump, placing it into a fail-safe mode.

Figure 11:
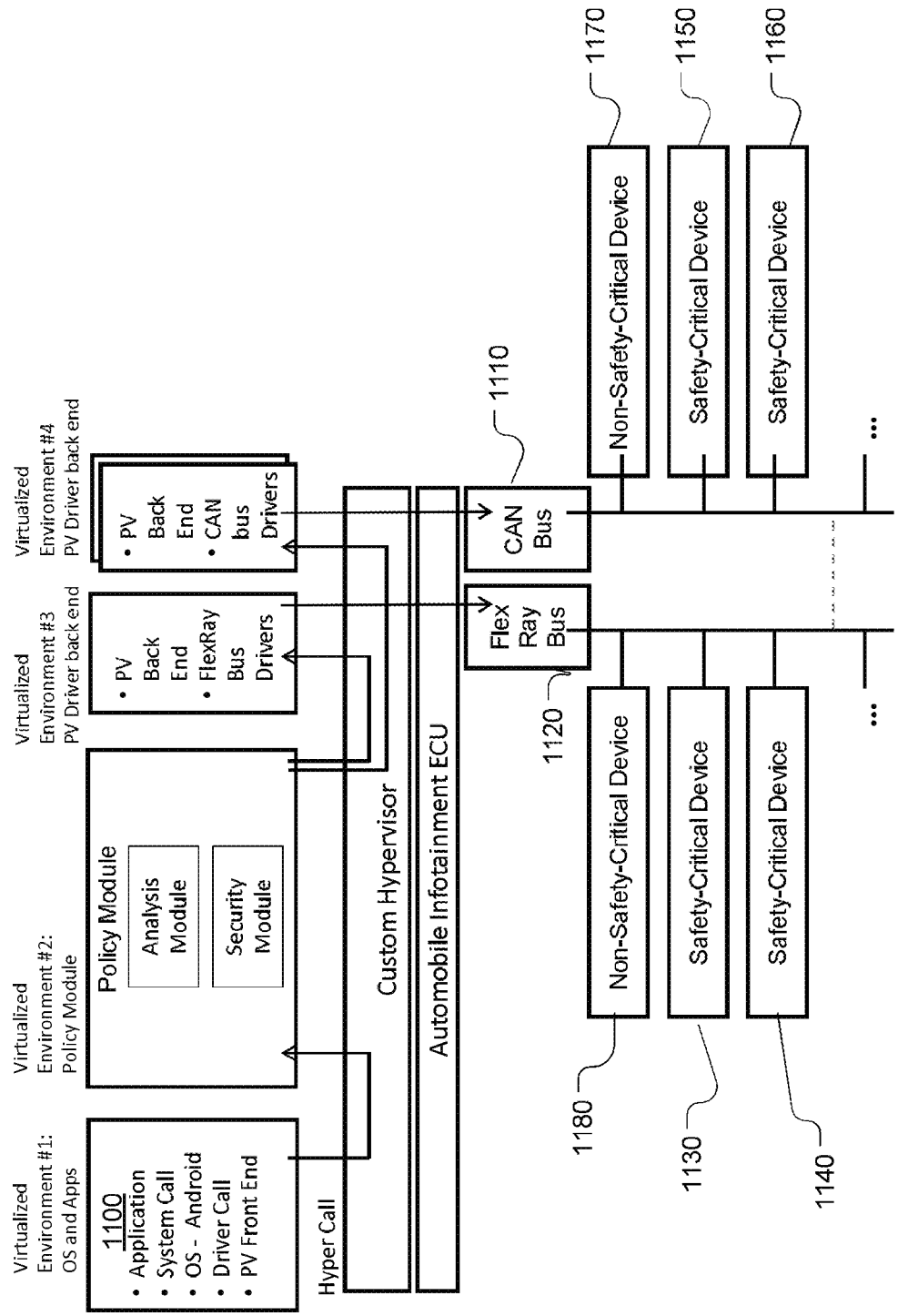
Figure 12:
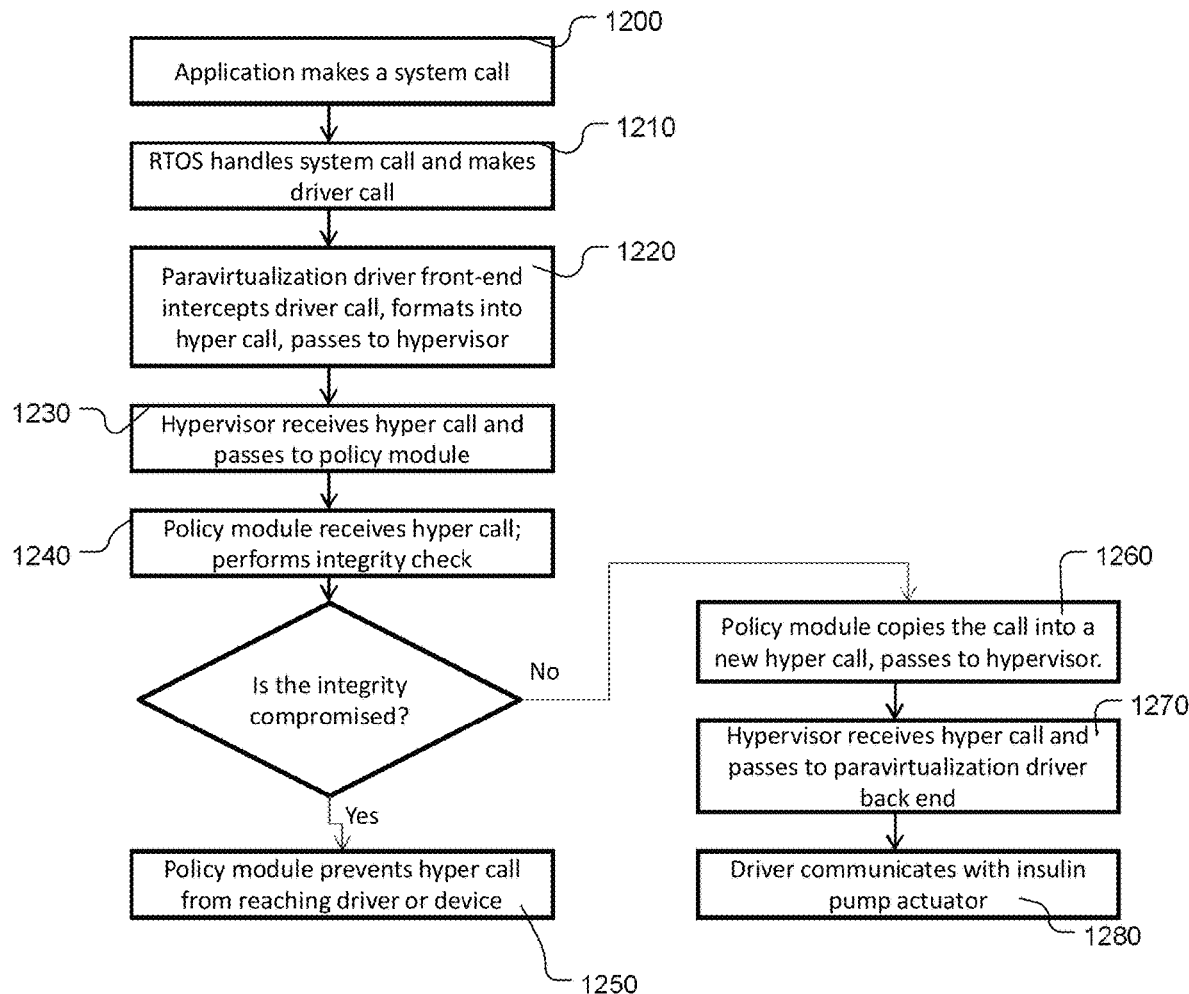

FIG. 11 shows a schematic of a paravirtualized security threat protection system, in accordance with an embodiment of the present invention, implemented in an automotive environment. FIG. 12 shows a flow chart of logical processes applicable the embodiment of FIG. 11. An automobile may contain a plurality of electronic control units (ECUs) that are in communication with each other over one or more different busses. For example, one electronic control unit (ECU) within an automobile may contain a CPU with an OS that runs an infotainment application (playing media, connecting to the driver's phone, etc.) 1100. This ECU is connected to a central bus (e.g. CAN 1110, FlexRay bus 1120) that manages multiple systems within the automobile, including several that are safety critical (e.g. airbags, brakes, etc.) 1130, 1140, 1150, 1160 and other systems that are non-safety critical (e.g. music streaming, heat and air conditioning etc.) 1170, 1180. Because the infotainment application is not supposed to interface with safety critical systems, it is desirable to prevent the communication between the infotainment application and these safety critical systems.

For example, the infotainment application may request to send information on a central bus (1110, 1120). This request is converted by the infotainment application into a system call that is made to the OS (1200). The OS makes a driver call to the associated driver stack based upon the system call (1210). The paravirtualized driver front-end intercepts this driver call, converts it into a hyper call, and passes it to the hypervisor (1220). The hypervisor passes the hyper call to the policy module in a separate virtualized environment from the OS (and infotainment application) (1230). The analysis module of the policy module parses the call being made by the infotainment application to determine if the call addresses one of the safety-critical systems on the bus (e.g. airbags, brakes) and forwards these results to the security module (1240). If the request is addressed to a safety critical system, the security module does not allow the transmission of the hyper call to the paravirtualized driver back end (1250). If the request is not addressed to a safety critical system, then the security module copies the request into a new hyper call and passes it to the hypervisor (1260). The hypervisor passes the hyper call to the paravirtualized driver back-end in a third, separate virtual machine from both the OS and the policy module (1270). The paravirtualized driver back-end processes the request by sending the data on the centralized bus (e.g. CAN or FlexRay) (1280). This approach provides the additional security benefit that a malicious actor that gains root access on the infotainment system still cannot communicate with safety-critical systems.

The policy module may also prevent attacks that occur between automobiles, such as in V2V ("vehicle to vehicle") networks and additionally may prevent attacks that mimic sensors on roadways V2I (vehicle to infrastructure). V2V networks have been mandated by the National Highway Transportation and Safety Administration for inclusion in new cars by 2018. Additionally, with the advent of autonomous/self-driving cars, federal laws and regulations will regulate how these vehicles operate. The policy module can ensure that the rules and regulations of the department of transportation (DOT) or NHTSA are followed by the vehicle and prevent these laws from being tampered with. The government may specify certain priorities (such as when a car is going to collide with a pedestrian, in what cases should the car be made to swerve to protect the pedestrian even if it puts the driver of the car at risk). The policy module can also help protect data (such as telematics data) about the car by encrypting the data or requiring authentication prior to the data either being received by the vehicle or transmitted from the vehicle. The policy module would stop GPS data from being spoofed and thereby prevent a malicious person from causing an autonomous vehicle to crash.

Within automobiles there are two primary networks. The first network is the wired network responsible for controlling and measuring different aspects of the car's performance that employs multiple protocols. These protocols include LIN, CAN, FlexRay, MOST, and Ethernet. In general, each of these wired networks includes buses that can be multi-master, multi-slave and have complex bus arbitration protocols. Thus, these networks are vulnerable if a malicious operator has physical access to the bus to inject packets onto the bus.

Automobiles also have a second primary network. This second primary network is outwardly facing and used to connect users' devices. The protocols supporting this network include USB and Bluetooth. The vulnerability in the outward facing network includes potential vulnerabilities in the supporting driver stack and application code inside of the car as well as the fact that anyone can connect their device to the car. These two primary automotive networks have different structures and different use cases that drive two separate threat models and two separate security solutions using the policy module and the security module within the policy module.

The wired automotive network is static. New devices are either never added or removed, or very rarely added or removed. In addition, the protocols in question do not implement the higher layers of the OSI model. Therefore, each connected device in general communicates using its own protocol defined in its datasheet. Because the devices fail to use the higher layers of the OSI model, behavioral and pattern recognition policies are less effective because fewer assumptions/statements can be made about the connected devices. Since the devices are static, the policy module may include polices for authentication for each device connected to this network. Either authentication can be accomplished using a man-in-the-middle implementation in which the policy module would be implemented in a hardware embodiment or the policy module would be implemented in software on a hardware device that is placed between the outfacing ports and the communication processor on the bus within the wired automotive network.

In one embodiment, the man-in-the-middle includes a separate circuit on the same PCB as each of the devices. This circuit would have two interfaces: (1) point-to-point connection with its associated device and (2) a bus connection. If the device sends a packet, this man-in-the-middle circuit would wrap the packet with an authentication wrapper and any packet designated for the device would be unwrapped before being sent to the device. In this way, authentication could be added in a completely transparent manner.

Authentication may be accomplished using a predefined table of connected devices that is stored or associated with the man-in-the-middle circuit. Another method of authentication may be accomplished using the man-in-the-middle circuit is by accessing a centralized trusted third party, such as a certificate authority. In this embodiment, the authentication wrapper includes a certificate identifying that device as being trusted by the trusted third party and therefore, the file will be processed having been authenticated.

Checking authenticity in either of the above ways can also include a method to provide integrity attestation. The authentication wrapper can include a signature of a program image running on the chip that is trying to send the data. This would allow checking if someone has tampered with the data source or modified its code.

The second primary automotive network is externally facing and in general supports the car's infotainment system. In addition to driving functionality such as displays, speakers, user input/buttons system, modern vehicles also allow users to connect their devices to this system using protocols such as USB and Bluetooth. In this case, unknown and potentially malicious devices could be connected to the infotainment system via these protocols. A two-pronged approach to security is required. First, one must authenticate connecting devices before allowing access to the car's functionality. Authentication can be accomplished by the policy module, which would check the authenticity of the device by comparing the identification of the device with a predetermined list. Second, even after authentication, one must harden the internal driver stack and application code that interfaces with these devices to protect against potential intrusion. Although some Bluetooth devices enable authentication, there are many that do not, and USB does not support any authentication whatsoever.

A layer of security may be added to Bluetooth, USB, and other externally facing protocols leveraging secure environments, such as Intel Deep Defender, IntelSGX and ARM TrustZone. For example, Deep Defender provides a secure environment for some code to run that guarantees the integrity of itself and certain sections of the operating system at boot time. Deep Defender protects against BIOS level and hardware level attacks where you modify the firmware. In addition, during operation, Deep Defender acts as watchdog looking for unusual behavior in the operating system as well as changes in the operating system itself (it periodically calculates a check sum and matches that against an internal baseline).

Intel Deep Defender is targeted toward rootkits (incursions into the operating systems from applications). It is not targeted to incursions into the operating system from devices. The policy module code can be inserted inside the trusted environment of Deep Defender for authentication of any connection. Additionally, the code may include behavioral checking of the devices themselves and integrity checking of the USB driver stack. Behavioral checks may include checks regarding the sending and receiving of data along with timing involved with such tasks. It should be understood that the policy module is used herein and throughout the specification may be implemented as a software, hardware, or firmware solution providing a secure enclave for performing analysis and security management.

This security approach for USB and Bluetooth provides a technology platform, not just a solution for a specific vulnerability, since this approach addresses the USB and Bluetooth protocols that are continuously being used to connect diverse devices to an automobile. For example, Ford is providing a standard open source interface (an API) to access the car's information via Bluetooth and smart phones are able to access the internet via USB if host has internet access.

The policy module as described in detail above may also be advantageous to the information technology community. The policy module could be implemented in an external USB hub, PCI-Express card, an ExpressCard, a tablet or slate. The IT staff may provide policies to these devices and limit access or distribution of data.

In another implementation, the policy module measures the driver and detects if the driver has been exploited. For example, a hash may be created and used to guarantee lack of tampering. Other measurements may include source or binary instrumentation of the driver that, for example, allows for runtime measurement of execution. When the policy module is deployed across multiple devices or systems, data sharing/big data analytics can be used to identify attacks that fall into the category of APT (advanced persistent threat). The data analytics can be obtained by any known method and then provided to the policy module in the form of a rule that uses the data analytics as the basis for the rule. Data analytics may be acquired and analyzed in a centralized location. The results from the centralized analysis can be pushed to each endpoint's policy module using industry standard enterprise push technology. In other embodiments, results from analytics do not need to be used by the policy module. The policy module may simply send data one-way to a centralized or de-centralized analytics engine that identifies trends. In such embodiments, the policy module collects unique data in a secure way. The policy module is capable of gathering data that was not previously gathered in a systematic way, and it ensures the security of the data gathered.

The policy module can notify the system administrator of new threats and detect driver code flaws being exploited. The policy module can also act as an analytics platform for machine learning to detect anomalous behavior.

In still further embodiments of the invention, the policy module may be used for authenticating the backing up of data. Data in both secure and non-secure facilities is regularly backed-up onto external media, however, there are currently multiple points for someone with access to the hardware to steal the data. The policy module can be configured to encrypt and sign the data as it is copied onto the external media. The encryption is bound to private keys inside of the policy module and the computer, and requires valid user credentials to unlock. Any attempt to decrypt or tamper with the data without being on the designated computer/network, will be unsuccessful since the private keys will not be accessible.

Another contemplated use of the policy module in connection with USB and other media interfaces is the transfer of avionics data. The avionics and mission planning data on aircraft must be periodically updated at multiple ground stations, often done using the same portable media. USB and other media interfaces are vulnerable to attacks that can compromise these systems' integrity during these updates. Even more critical, the data itself is at risk of being lost, stolen, or altered. The computer on the aircraft would be configured with the policy module added as either a separate hardware or software module. In the avionics industry a different hypervisor other than Xen is typically used such as Greenhills Integrity or General Dynamics' hypervisor based on OKLA. The policy module can be used to protect those aircraft media interfaces from attacks and unauthorized transfer of data by encrypting and signing the data on the external media used to transfer data to the aircraft. The policy module on the aircraft would be used to verify and decrypt the data. Even if the removable media is lost or stolen, the data on it cannot be decrypted. Additionally, if data is maliciously altered by an insider having access to the hardware, the policy module will prevent the malicious data from being uploaded to the aircraft. It should be noted that the communications between components is similar to the embodiments described with respected to FIGS. 7 and 8 with the noted exception of a different avionic specific hypervisor.

The policy module may also perform other functions including changing data. For example, if a key stroke is received over a I/O connection (wired or wireless), such as "Ctrl_Alt_Del", the security module may not transmit these key strokes or change the data pertaining to the key strokes before sending unless the user has approved administrator permissions. A policy module tasked with encrypting data may also be able to obfuscate data access patterns. This functionality would provide added security that prevents the hardware or driver from being able to steal secret information indirectly through analysis of memory access patterns. Obfuscating access patterns can include adding dummy accesses to hide the access to the desired location in memory.

For some implementations, the policy module may be tasked with encrypting data or implementing some other security process and can be made filesystem-aware. Credentials/permissions or an access control list (ACL) are stored on an external device (like a flash drive). This integration allows the permissions managed by the policy module into the filesystem of the peripheral device. A filesystem-aware embodiment allows a removable media (e.g. a flash drive) without internal 'intelligence' to enforce user-access permissions (e.g., who has permission to read what data). This is valuable because then a flash drive can be used with multiple arbitrary, and potentially overlapping, compartments of access security (such as at the user or group level). This enables granular management of permissions for individual files on a mass storage device without large overhead. Further discussion of access control embodiments is provided below.

Embodiments of the invention are also applicable to cloud and enterprise big data applications (BDA) environments. An example cloud environment includes workstations running operating systems (OS), such as Windows 7, which have virtual desktop infrastructure (VDI), such as through a software client, such as Teradici PCoIP (PC over IP). This can include, but is not limited to "thin clients" and "zero clients" and "software-only clients." For example, the policy module can run on the workstation and provide security in a manner transparent to the VDI. In another example, the policy module is part of the VDI and provides security through the software client. In another example, a software agent running on the workstation is in communication with the policy module running in a separate device connected to the workstation, in a manner transparent to the VDI. In another example, a software agent, including an application and a driver, runs on the software client and communicates with the policy module, which in turn runs in a separate device connected to the workstation. In such an example, the policy module provides security when the software client is pushed to the workstation and when devices are connected to the workstation.

A further example of a cloud environment is a system with servers, such as Dell blade servers running VMWare Horizon View and other servers running Microsoft Active Directory, and thin/zero clients, such as Dell Wyse P25 and P45 desktop models. There may be multiple virtualized environments, such as one running Windows Desktop 10 and one running Red Hat Linux 7.2 that may be accessed by a given thin client. The policy module could provide security as part of the VDI. In one example, a software agent runs in each virtualized environment and communicates with the policy module in a different virtualized environment via a hypervisor. In another example, it is on or connected to the thin/zero client itself. In another example, there is a policy module within the virtualized environment running, for example, Windows Desktop 10 and in the virtualized environment running, for example, Red Hat Linux 7.2.

Another embodiment of the invention in cloud environment includes consolidated or centralized desktop infrastructures (CDI), such as thin or zero clients that can access multiple networks. For example, these multiple networks can have multiple security levels as is common in certain financial sector, health care, and defense networks. In one example, each network has multiple individual isolated enclaves, each with a granular description of network-level access control. When a user logs in to the thin client, the user chooses which enclave to access and access control is provided through a directory service, such as Microsoft Active Directory, Oracle Unified Directory (OUD), and Oracle Access Manager (OAM). In this example, there is a policy module for each network that provides security leveraging a heuristic access control list, deriving access control policies from Active Directory, and enforcing security on devices, including devices connected to thin clients. The policy module runs in the thin or zero client or in a device connected to a thin or zero client. The policy module is in communication with a software agent to provide security. In this example, such security could include mutual authentication between the device connected to the thin or zero client and the virtual machine that is pushed to the thin or zero client by a server. In this example, there are multiple enclaves where data transmission between enclaves must be regulated. Each enclave may include a software agent. In this example, some software agents may be compatible with different operating systems, such as some with Windows and some with Linux, depending on the OS used by the virtual machine being accessed in the enclave. The policy module and supporting software, firmware, and hardware on the device would be compatible with both Windows and Linux or any other OS to communicate with the software agents.

Possible Security Processes Performed by the Security Module that is Part of the Policy Module A wide range of security processes can be invoked once a security threat has been determined to exist, in various embodiments of the present invention including the issuance of challenges to requesting entities. Some of these processes, discussed above, include preventing the hyper call from reaching the driver, indicating that the device has been compromised, and encrypting data that is being processed. The following listing of possible security processes is provided for exemplary purposes only and should not be seen as being limiting or exhaustive.

The policy module may include security processes including sensors such as biometric scanners, altimeters (e.g. to avoid in flight updates), requiring CAPTCHA authentication, authentication tokens, location restrictions as measured by GPS and requiring the entry of passwords for authentication and to provide challenges to a requesting entity. Security processes may also limit access based upon the type of connection, the type of device initiating the connection or the time of the connection. For example, the security processes may limit access based upon which network the device is connected to and how the connection is made (directly locally or remotely).

The security processes may also include the ability to create messages and send alert messages to designated parties based upon a predetermined list. The data may also be sent to a log or logging tool or used for data analytics to identify common attacks. The security process within the policy module can also require data to be encrypted. For example, files may be encrypted, partitions may be encrypted, and meta data may be encrypted.

The security processes may redirect connections and requests to other software or hardware if a security threat is identified. The identified data may be sent to a secure hardware location and the data may be destroyed (e.g. detonated). This concept is related to the idea for the trusted execution environment such that any compromise of the software does not propagate to other aspects of the operating system/application software. In certain configurations, the policy modules within a network may be in communication with each other and include code for identifying common attack patterns.

In other embodiments of the invention, the security process may address the requirement for remote management of the policy module when it is attached to a network-connected workstation. In such an embodiment, the policy module is remotely configurable to elevate the user security level and to restrict the user security level. The policy module may be remotely configurable to add, delete, or change compartment access within the user's approved security levels.

In other embodiments, the policy module includes security processes that allow data stored on a USB storage device to be viewed on a trusted workstation when the trusted workstation is connected to an untrusted network. The policy module may also include other security processes for uncontrolled devices as described below including enabling authorized local users to be allowed access to files on a USB storage device. The policy module may be configured to prevent authorized remotely connected users from having access to the files on a USB storage device. The security processes of the policy module can perform hardware-level verification of all data packets transmitted over the USB to prevent attacks such as denial of service (caused by specific malicious code or fuzz attacks), and protects against vulnerabilities in kernel driver on the protocol layer.

Enforcement of Access Control Providing File-Level Access Security for Uncontrolled Devices As part of the discussion of uncontrolled devices, it is useful to define a context in which uncontrolled devices often appear, namely an enterprise network. As used herein, the term "enterprise network" refers to any business network that has formal policies and provides file access control. As the term is used in this application, an "uncontrolled device" is a device that (i) when in an enterprise network, is outside of the supervision of other components of the network, and (ii) when in an environment assembled by a manufacturer, has been placed in the environment outside the supervision of the manufacturer, by a third party, after the environment has been assembled. Uncontrolled devices in an enterprise network lack a mechanism for communicating with a centralized authentication authority and they lack a mechanism for providing access control to files or partitions of memory. In contrast, controlled devices in an enterprise network are centrally tracked by Active Directory (AD) Domain Services (ADDS) or the device has been issued a certificate by Active Directory Certificate Authority (ADCA). In general, at the enterprise level the domain controller that provides the domain services and the certificate authority resides within the network of the enterprise. Controlled devices in an enterprise network typically include laptops, servers, routers, mobile devices and printers that are coupled together in the network. All of these devices are controlled by an information technology (IT) administration. In contrast, uncontrolled devices within an enterprise network include, among other things, USB drives, iPads, smart watches, thumbdrives, and unauthorized laptops, because, unlike controlled devices, they are not centrally tracked by Active Directory (AD) Domain Services (ADDS) or have been issued a certificate by an Active Directory Certificate Authority (ADCA). Thus, uncontrolled devices such as USB devices are not network-connected devices and they do not query Active Directory or other centralized management for identity and authentication.

It should be understood that in other application environments, outside of an enterprise network, a controlled device would not necessarily be in communication with a central authorization authority, but they would typically be placed in the environment under supervision of a manufacturer. For example, controlled devices in an automotive embodiment would come through an approved supply chain (typically, the automobile manufacturer) whereas uncontrolled devices include devices that are connected to an automobile by a driver, passenger, or mechanic through one or more of the exposed ports, and thus outside the supervision of the manufacturer.

When an uncontrolled device is connected to a host computer, even if the host computer is in an enterprise network, by definition, the uncontrolled device (which may, for example, be a USB flash drive) cannot enforce access policies of an active directory of the enterprise network. USB devices are typically memory blocks that cannot query the active directory or enforce any rules of the active directory. USB devices and other uncontrolled devices have not been equipped with either a hardware or a software implementation for securing access to data (e.g. files) on the uncontrolled device nor have the uncontrolled devices been implemented with secure/encrypted authentication protocols for user access.

By incorporating the policy module in a secured environment, whether the policy module is implemented in software as described above or the policy module is implemented in hardware in which the policy module is a physical device that sits between a host computing device and the USB or other uncontrolled device, the policy module ensures that rules are enforced, even by uncontrolled devices such as USB flash devices.

Another requirement for file-level access control is that the encryption scheme should not be brittle, meaning that if one user's credentials (public/private key pair) are compromised, then the entire system should not be compromised also. Further, it is not acceptable to retain a full copy of AD locally on USB devices or on a policy module—because the AD contents are private (i.e. who has access to what information should not be accessible to the public), and it would be an extremely large amount of data.

In this embodiment of the policy module, the group permissions from AD are translated into an associated access control list (ACL). The access control list contains a listing of authorized users and the files for which the authorized users have access to on the uncontrolled device. From this access control list, a heuristic access control list is created (HACL). The heuristic access control list is then stored on the uncontrolled device. The heuristic access control list is created by encrypting each file to be placed on the uncontrolled device with a symmetric key. In one embodiment of the invention, each file is encrypted with a different symmetric key to provide file level access control. Thus, a listing of symmetric keys is stored on the uncontrolled device. For each authorized user, the list of symmetric keys is encrypted with the public key of the user. For each user there will be a separate encrypted file of symmetric keys, which identify the files that the user can access. Thus, the heuristic access control list is encrypted set of symmetric keys for encrypted files stored on the uncontrolled device. The files on the USB device are thereby encrypted in such a way that only users with the correct permissions can access them. This enables transparent management of user groups by an administrator using AD even in the unique environment of USB devices where file permissions cannot be enforced by their container (e.g. the USB device).

In this embodiment of the invention, transparent enterprise-level management of access permissions is implemented without a trusted computing base enforcing them inside of the container for the information (i.e. inside the uncontrolled device). The disclosed embodiments not only achieve this objective, but also do so by leveraging industry standard tools in a scalable, low-overhead manner that is instantly applicable and implementable in the current enterprise context. This is a critical enabling technology for using USB devices in a secure manner.

The policy module issues challenges to uncontrolled devices (e.g. USB peripherals), including challenging the permissions of the user and challenging the authenticity of the data. The challenges and how these challenges may be issued in the course of communicating with USB peripherals are described in further detail below. Then, options are presented for how these challenges may be implemented, depending on the embodiment of the invention. There are two categories of challenge options presented: (1) options for storing heuristic access control lists (HACLs) in the system and (2) options for updating the ACL information.

When the policy module is installed, a multi-factor authentication of the user, policy module, and host machine occurs. Thus, the challenges discussed here are based on successful negotiation of the multi-factor authentication. Although not specifically discussed below, it is understood that embodiments of the invention may also include the following processes: the establishment of and communication with a trusted central authority that generates and manages credentials, the translation of credentials into ACLs, HACLs and provisioning.

If a host machine requests reading data off of a flashdrive, challenging the permissions of the user involves determining whether the user is allowed to access the data that is being requested. Challenging the authenticity of the data involves ensuring that the data on the flashdrive has not been tampered with. In the course of communicating with USB peripherals, the policy module leverages cryptographic algorithms to determine if the user has permission to access the data. If the user has permission, the policy module will verify the authenticity of the data. If the data has not been tampered with, policy module will unencrypt the data.

The user permission information is rooted in the encryption key such that, if the user does not have permission to access the data, the user will not have the key to decrypt the data even if the user has an installed policy module associated with a host computer. How these challenges can specifically be implemented pertain to where the information with the permissions and encryption keys resides and at what granularity permissions and encryption is applied to data (e.g. per file, per partition etc.).

Before explaining the options, a description of the permissions and encryption information in the context of this invention is provided in an example. Reference to certain standards and protocols is provided as an example and should not be seen as being limiting.

Figure 13:
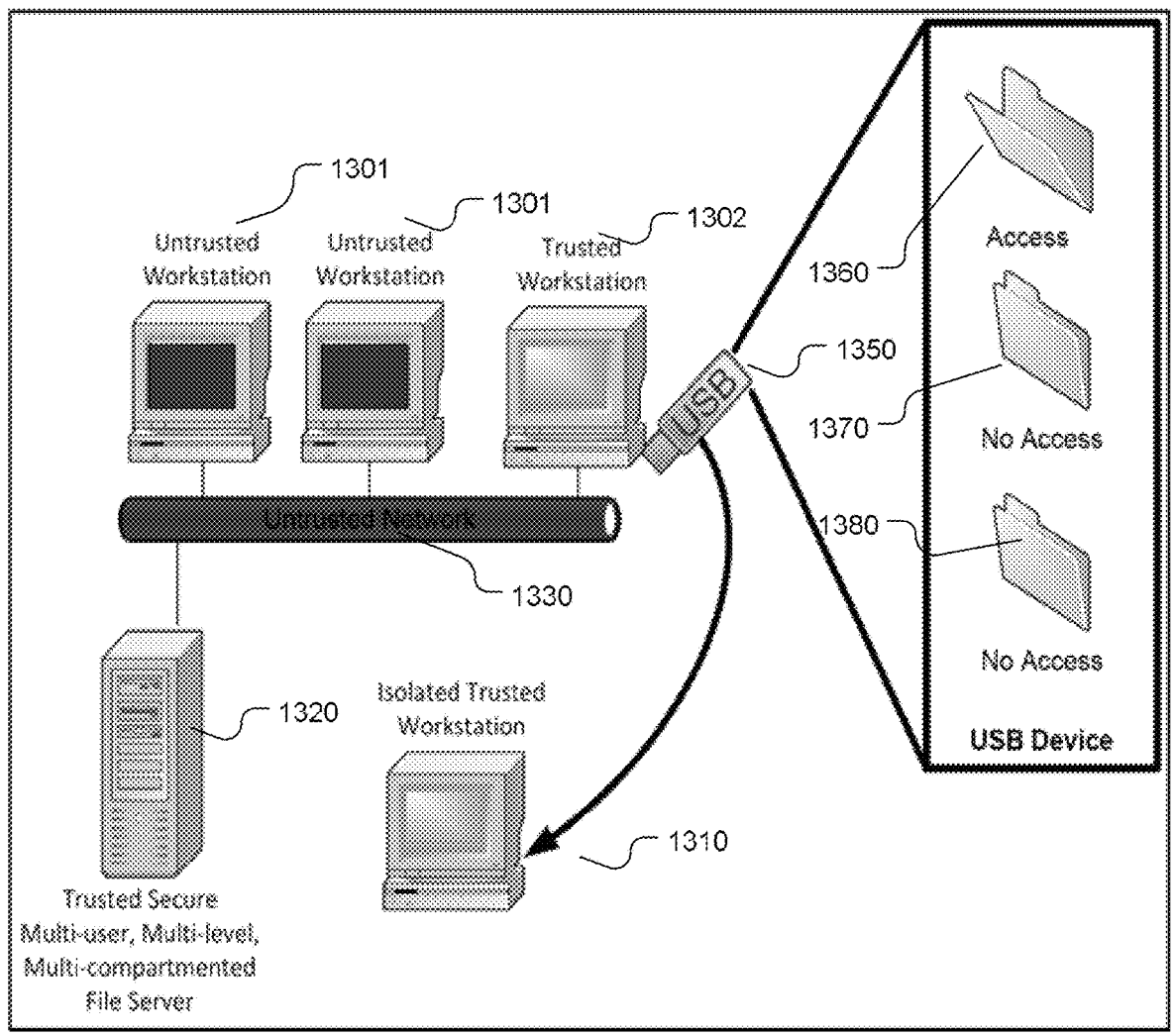
FIG. 13 shows an environment for implementing file access control of removable media in accordance with one embodiment of the invention.

For example, a host machine such as a trusted workstation 1302 or an untrusted workstation 1301 may request to read a file off of a flashdrive 1350 as shown in FIG. 13. The trusted and untrusted work station 1302, 1301 are networked together through network that is presumed to be an untrusted network 1330 and the network contains a trusted secure multi-user, multi-level file server 1320. This server 1320 may include an active directory or be coupled to domain controller and a certificate authority. In other scenarios, an isolated trusted workstation 1310 may be presented with USB flash drive 1350 and request to read files from the USB device 1350. In each configuration, a policy module (not shown) is associated with the workstation 1301, 1302, 1310 to which the uncontrolled device is connected.

Figure 14:
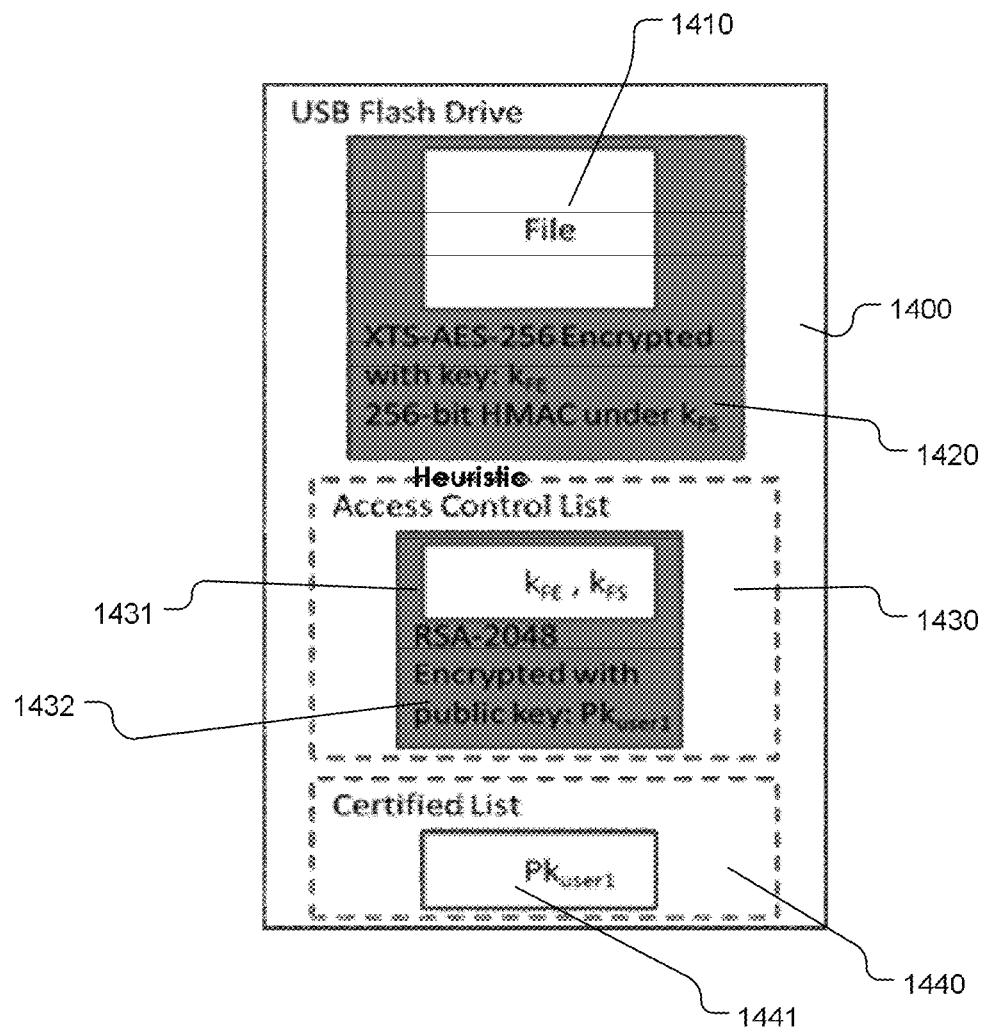
FIG. 14 shows a representative removable media and the data stored in memory for providing file access control of the data on the removable media in accordance with one embodiment of the invention.

The file(s) 1360, 1370, and 1380 on the uncontrolled device (e.g. the USB device 1350) are encrypted using symmetric key encryption (e.g. XTS-AES-256). The files 1360, 1370, and 1380 may be signed/authenticated using symmetric HMAC (under a 256-bit SHA). In one embodiment, signatures are performed on a per-memory-block basis and stored in a single file on the flash drive. In order to encrypt/sign data being transmitted to a USB mass storage device and then be able to decrypt/authenticate the data later using symmetric key encryption/authentication, the symmetric keys for encryption and authentication (kFE (key for file encryption), kFS (key for file signature) must be retained. Both of these symmetric keys (kFE, kFS) must also be encrypted. These symmetric keys (kFE, kFS) are therefore stored as a part of the Heuristic Access Control List (HACL), which only allows users with permissions to recover the symmetric keys. The HACL leverages asymmetric cryptography to accomplish this. The HACL is stored on the flash drive as a set of metadata separate from the file. Additionally, in certain embodiments, a certified list of public keys of authorized users or a list of authorized users may be stored as a metadata file to determine if a user is an authorized user. However, this list is not essential as mere presentation of the user's private key can be used in conjunction with the HACL to determine if the user has authorization to access one or more files on the flash drive. The permissions and encryption information includes the HACL and Certified List, are stored alongside the File as shown in FIG. 14. In certain embodiments, the certified list may simply be a digital signature listing for each unique instance of the HACL. Thus, there can be a distinct HACL file for each authorized user wherein the HACL file is encrypted with the user's public key. This digital signature can be used to confirm that the HACL file has not been tampered with by confirming a hash of the HACL file.

FIG. 14 is a simplified representation to facilitate explanation of the options below. Commercial implementation may involve leveraging a binary tree to improve the asymptotic complexity of adding/removing users from O(n) to O(log(n)), where n is the number of users in the ACL. This approach is important for scalability in systems with multiple users and multiple user groups. The uncontrolled USB device 1400 contains one or more files 1410 that are encrypted and may be signed 1420. Additionally, on the uncontrolled device is a heuristic access control list 1430 that contains the keys and signatures Kfe and Kfs 1431, which is encrypted with the user's public key 1432. If there is a plurality of authorized users, there will be a separate HACL file for each user that is encrypted with the user's public key. Additionally, a certified list of digital signatures 1441 is provided. The certified list 1440 may simply be a digital signature for each HACL that can be used to confirm that the HACL has not been tampered with. The certified list can also include the public keys of the users that have access to the files that are contained on the uncontrolled device and preferably, this list of public keys would also contain a digital signature from a certification authority.

The challenge implementation options pertain to where the information with the permissions and encryption keys resides and at what granularity permissions and encryption are applied to data. Three metadata options and three key management options are documented below.

Options for Storing HACLs in the System

Option 1

Figure 17A:
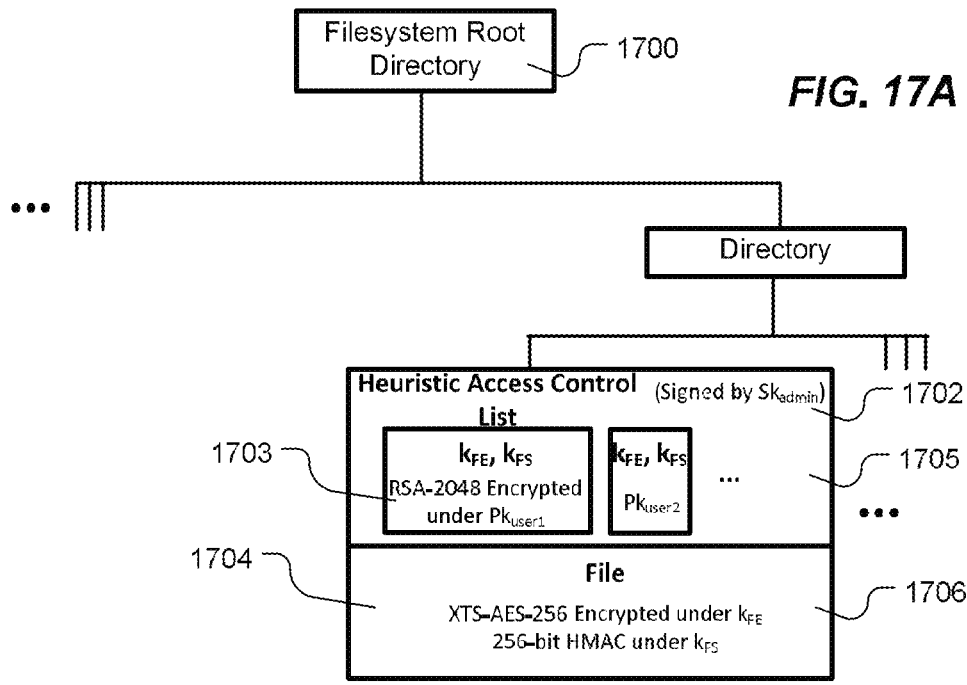
FIG. 17A is a first exemplary embodiment for storing meta data and keys alongside every file on a flashdrive or other removable media.

As shown in FIG. 17A, a heuristic access control list 1705 containing the encrypted symmetric keys 1703 is stored alongside every encrypted file 1704 on the flashdrive (i.e. uncontrolled device). As shown, there is a separate HACL file for each authorized user (e.g. PKuser1, PKuser2 etc.). The HACL is digitally signed 1702 by an authorized signatory authority. Each file 1704 is encrypted using the symmetric key 1703 for that file that is stored in the heuristic access control list and the file can be decrypted by an authorized user having the proper private key (e.g. PKuser1, PKuser2 etc.) Additionally, the file may also include keyed-hashing for message authentication (HMAC) 1706. Optionally, the uncontrolled device may contain a certified list of users public keys that are authorized users are stored separately from the HACL and encrypted files. The certified list may be signed by a certificate authority that certifies that the list is authentic. Both the uncontrolled device and the certified lists are coupled to the filesystem 1700 on the uncontrolled device.

There are three key advantages to this configuration. First, it allows for a high degree of granularity, i.e. each HACL file can specify a unique group of users who have access to the file. Second, this option does not require modification to the filesystem on the flashdrive. Third, if kFE or kFS of one of the files is compromised, none of the other files is compromised because each file has its own kFE and kFS.

Option 2

Figure 17B:
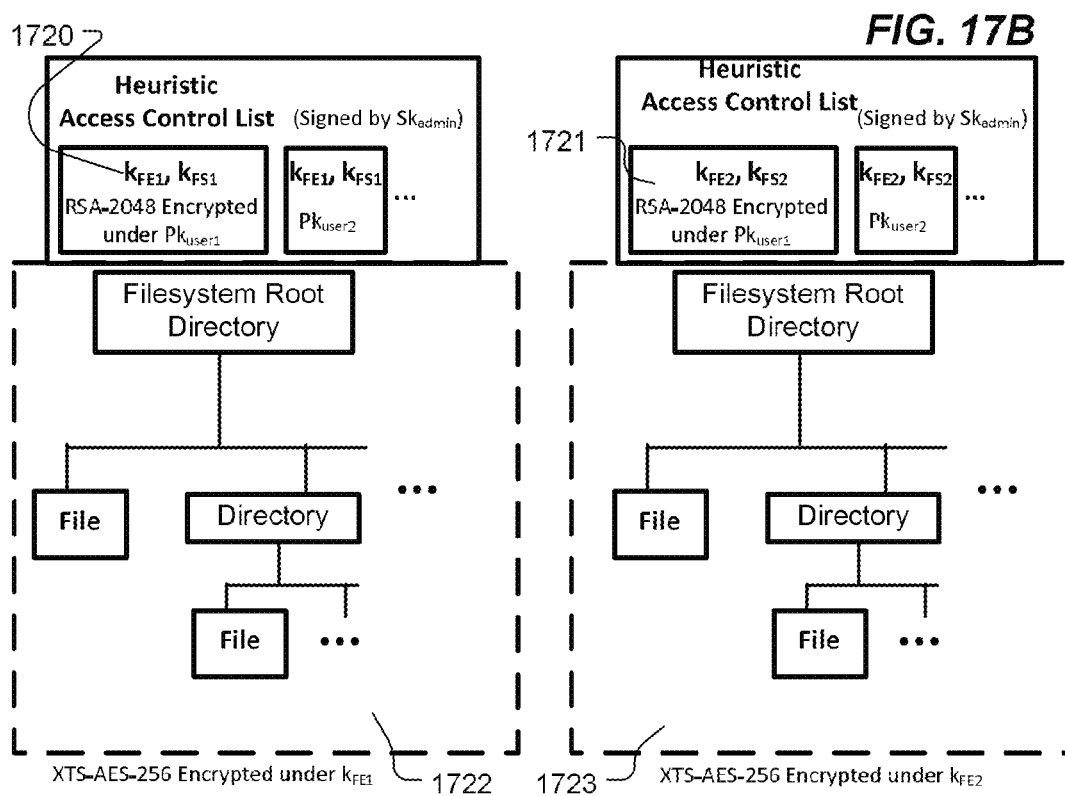
FIG. 17B is a second exemplary embodiment wherein each partition is encrypted on the flashdrive or other removable media as opposed to each file.

In this embodiment of the invention as shown in FIG. 17B, instead of encrypting a file, the entire partition of the USB flashdrive or other uncontrolled device is encrypted. The permissions and encryption information is stored alongside every partition on the flashdrive. As shown, the uncontrolled device (e.g. USB flashdrive) has two separate partitions 1722 and 1723. Each partition has its own heuristic access control list 1720 and 1721 respectively.

Since the permissions and encryption information is only stored once per partition, the memory storage required as well as the communications and computational overhead are low.

If there is only one partition on the flashdrive, the disadvantage is a lack of granularity, i.e. only one group can use the flashdrive. This does not support multi-level, multi-compartmented information.

Option 3

Figure 17C:
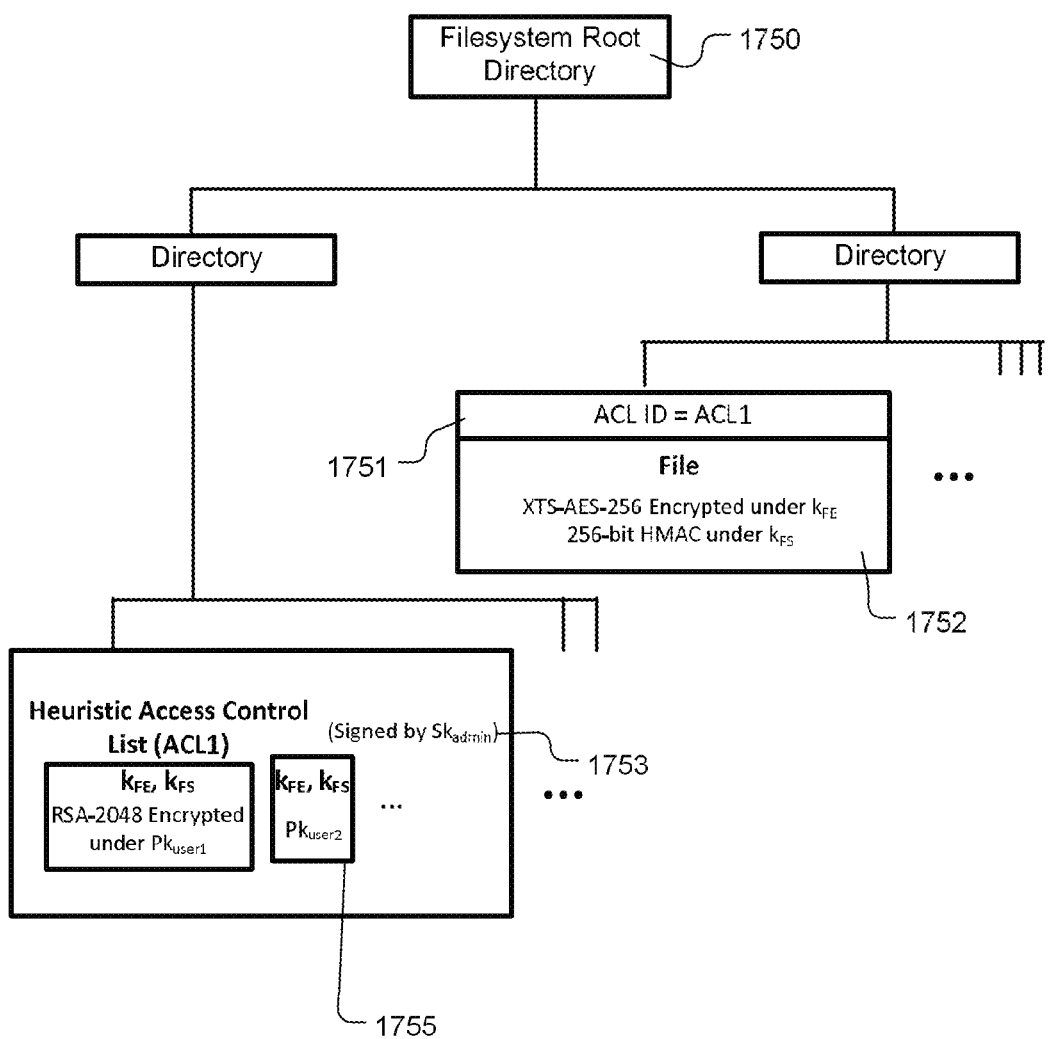
FIG. 17C is a third exemplary embodiment wherein the permissions and encryption information are integrated into the filesystem itself.

A third embodiment of the invention benefits from the granularity advantage of option 1 and the storage and overhead advantages of option 2. Option 3 as shown in FIG. 17C integrates the permissions and encryption information into the filesystem itself in a backwards-compatible manner. This would allow a centralized HACL 1754 having a plurality of different encrypted symmetric keys 1755 etc. that is then assigned using an addressing mechanism 1751 (ACL ID=ACL1) to individual files 1752 etc. through the filesystem 1750.

Two primary architectural approaches have been identified to implement option 3. First is overlaying a new access control scheme to support permissions on top of FAT32 that is backwards compatible. The second involves re-formatting the flashdrive to use a new filesystem that does support permissions. This approach involves integrating the specific permissions and encryption information into the filesystem.

Options for Updating the Heuristic Access Control List Information

Figure 15A:
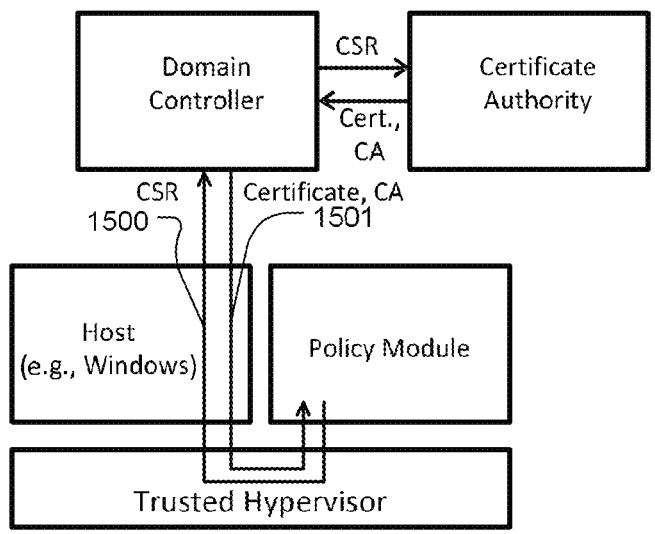
FIGS. 15A and 15B are exemplary flow charts depicting an embodiment of the invention showing how user permissions that are residing on the domain controller are translated to an endpoint (e.g. an uncontrolled device) for a heuristic access control list.
Figure 15B:
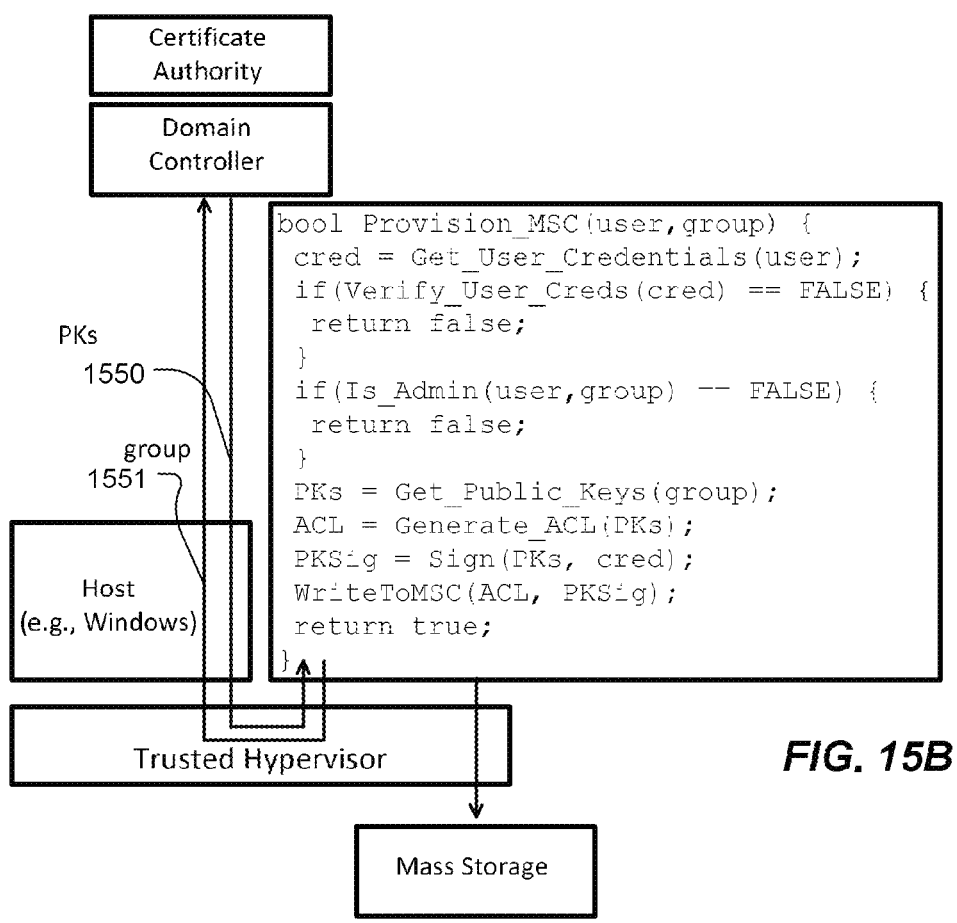

In addition to the management of metadata on the flash drive itself, there are options pertaining to the management of the keys that are used to encrypt/decrypt data on the flash drive. In the model described above, files are associated with symmetric keys (kFE, kFS). The creation and management of these keys can be managed in different ways. FIGS. 15A and 15B depict how the user permissions that are residing on the domain controller are translated to an endpoint (e.g. an uncontrolled device) for the heuristic access control list. FIG. 15A establishes the provisioning of the heuristic access control list (HACL). In this figure, the policy module sends a CSR (Certificate signing request) to the domain controller. The domain controller forwards the request to the Certificate Authority. The Certificate Authority (CA) decides whether to sign the CSR 1500 and issue a certificate 1501 to the policy module. Thus, the policy module has a certificate confirming that it is (a) an authentic part of the network for the CA and (b) is allowed to provision the uncontrolled device.

FIG. 15B shows the communications between the policy module and the uncontrolled device (e.g. USB flash drive) once the certificate has been received by the policy module. When provisioning the uncontrolled device, the policy module executes a series of steps. An example of these steps is shown in the pseudo code. The provisioning algorithm tags the arguments: group and userID wherein the userID generally represents an administrator of the group. The policy module first checks the user's credentials to see if the user has the correct privileges for creating a group 1551 by contacting the domain controller and/or the certificate authority. Second, the policy module obtains the list of public keys 1550 that are associated with each member of the group. The policy module may obtain these public keys by making a request to the certificate authority (as depicted), or the policy module may have the public keys stored locally. The policy module then generates the HACL. The policy module generates a random file encryption key and encrypts the key under each public key of the group members (i.e. the authorized users) for the ACL. The policy module may also generate a signed list of the public keys of the authorized users of the group. The signature may be an RSA signature or the equivalent signature for the list of the public keys. This data is then written to the uncontrolled device (e.g. USB flash drive etc.).

The establishment of groups for setting up the HACL and allowing access to the files on an uncontrolled device may also be established in different ways. For the pseudocode in FIG. 15B "if(Is_Admin(user,group)==FALSE) . . . " this statement will return true for everyone in the group for the first option described below. It will return true only for a designated user in the group for the second option. Finally, it will return true only for the sys admin in the third option.

In a first option, the creation and management of the symmetric keys is distributed where any user who has been given access by the system administrator can initialize symmetric keys for the files and set up the HACL.

The advantages to this approach are that the symmetric keys never leave the vicinity of the flash drive. They are only present within the policy module while the device is in use, and are never transmitted to the host computer or to the centralized management system. The policy module through the trusted hypervisor and the host computer makes a certificate-signing request (CSR) to the domain controller. In response, the domain controller passes the CSR to the certificate authority and the certificate authority issues a certificate of authenticity, which is stored in the policy module.

In this approach, it is understood that a system administrator enforces that only certain groups are created. The centralized authority pushes a signed list of users to each policy module that will then be used to create the HACL. Each policy module is then responsible for ensuring that a given flash drive has a group that is allowed by the system administrator.

In a second option, authority for the creation of a group can only be obtained through the system administrator. For a given flash drive, the system administrator authorizes a specific user as the "owner". This owner is responsible for managing groups on the flash drive.

In this case, the owner creates and modifies the group membership independent of the system administrator. The HACL is then signed with the owner's credentials. Each user therefore verifies that the HACL signature is correct and matches the expected owner.

One advantage of this approach is that the HACL information can be stored locally within the host computer of the owner. In this way, if the HACL is damaged/corrupted on the flash drive, the data can be recovered by the owner by restoring the HACL.

In a third option for the creation of groups and management of the symmetric keys, the system administrator is the only one that can create groups. The system administrator decides the group permissions and also creates and manages the symmetric keys and their associated HACLs.

In this embodiment, instead of pushing specific authorized groups or owners, the system administrator pushes pre-populated HACLs for use with flash drives. Each ACL is signed with the system administrator's credentials. Each user then validates the ACL against the system administrator's credentials.

While this approach increases the management required by the system administrator, it provides the highest degree of security and enforceability as the key creation process is held by the administrator, and the process of adding/removing users is pushed directly to flash drives by the system administrator (instead of through a user/flash drive owner).

Figure 16A:
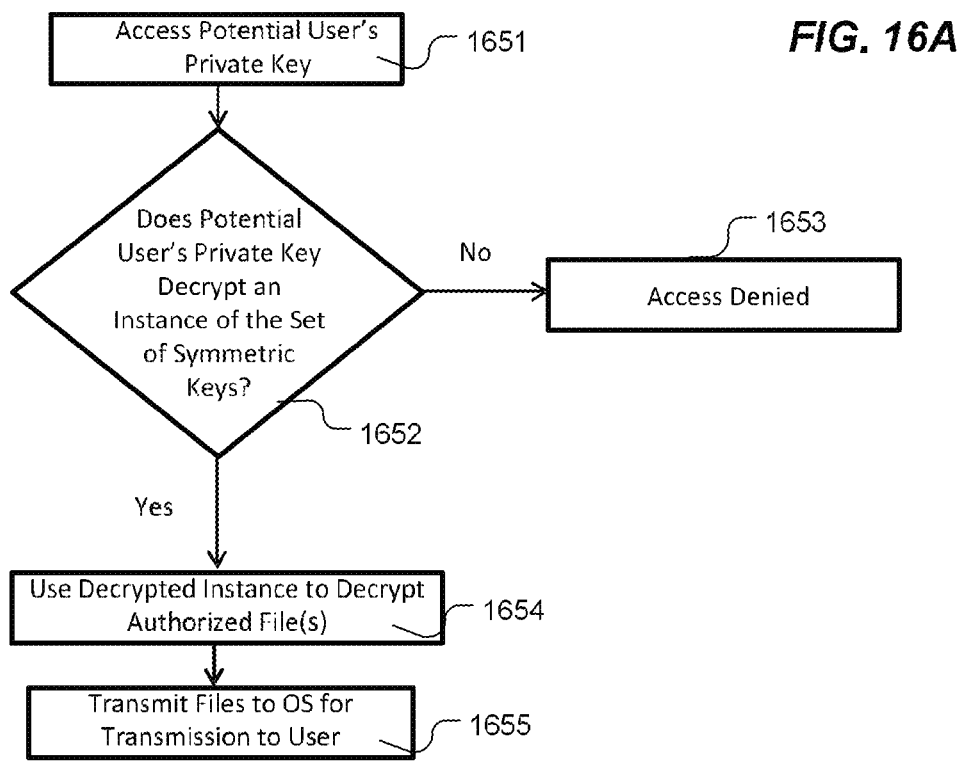
FIG. 16A is an exemplary flow chart in accordance with one embodiment of the invention showing actions performed by the policy module when a request for reading a file from an uncontrolled device is received.
Figure 16B:
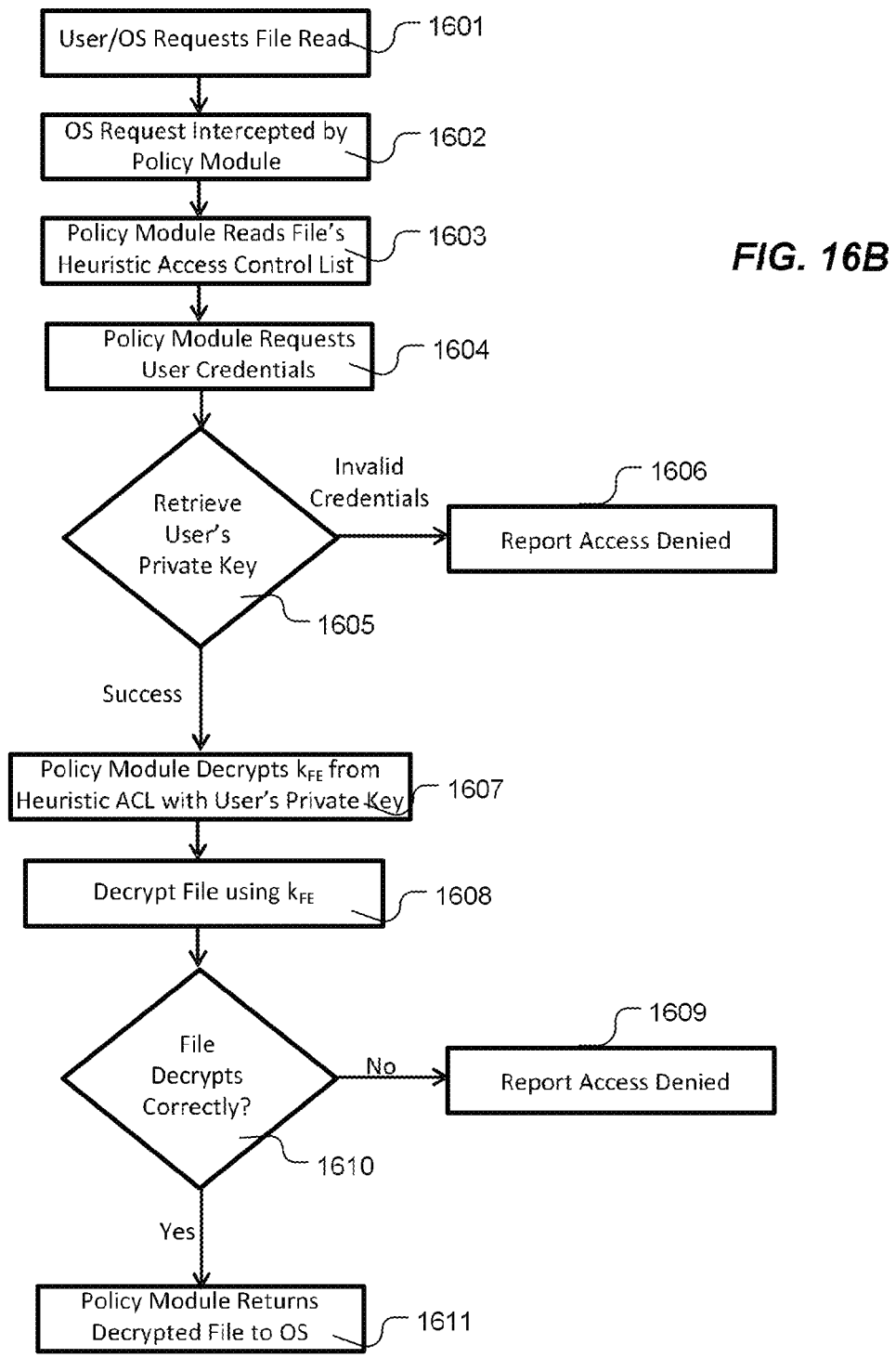
FIG. 16B is an exemplary flow chart in accordance with another embodiment of the invention showing the interoperation between the policy module and an uncontrolled device when a request for reading a file from the uncontrolled device is received.

FIGS. 16A and 16B are flow charts of embodiments of the invention for reading files stored on an uncontrolled device that contains at least one heuristic access control list in encrypted form.

In FIG. 16A, a policy module receives access to a potential user's private key 1651. The policy module queries whether the potential user's private key decrypts an instance of the encrypted set of symmetric keys stored on the uncontrolled device 1652. If the answer is "no", access is denied to the files on the uncontrolled device 1653. A report may be generated and provided by the policy module to the operating system to inform the potential user that access has been denied. In other, embodiments, the potential user is not informed that access has been denied. In yet other embodiments, a report is generated by the policy module and the policy module transmits the report to administrators of the network or enterprise network. The report may also be stored in associated memory for later retrieval and review. If the answer is "yes" then the policy module uses the decrypted instance of the symmetric keys to decrypt the authorized files using the appropriate symmetric key 1654. The policy module then transmits the decrypted and authorized files to the operating system for viewing by the potential user, who is now an authorized user 1655.

FIG. 16B provides a more detailed explanation of processes that may occur when a potential user attempts to read an encrypted file on an uncontrolled device. In FIG. 16B, first a user or operating system makes an operating system request to read files on an uncontrolled device (e.g. a USB flash drive etc.) that is coupled to a computer or a networked device 1601. The operating system request is intercepted by a policy module that is in communication with the computer 1602. The policy module may intercept the request using a trusted hypervisor as explained above. In an optional step that may occur at any time prior to providing the decrypted files to the operating system for viewing by the potential user, the policy module may read HACL metadata that is associated with the HACL file on the uncontrolled device. The metadata may be a digitally signed list for each HACL file to confirm that the HACL file has not been tampered with. In another embodiment, the HACL metadata may include a signed listing of the public keys for each of the authorized users that are allowed to access files on the uncontrolled device associated with an encrypted HACL file. In still other embodiments, the metadata listing may include the names of the authorized users and other information for verifying authenticity of the user. The policy module may use the metadata in the process of authentication.

In response to the interception of the read request, the policy module reads the HACL into local memory 1603. There may be one or more encrypted HACL files on the uncontrolled device and there may be an equal number of corresponding HACL metadata files. In one embodiment of the invention, there is a separate encrypted HACL file for each authorized user.

The policy module issues a request through the computer or networked device requesting the potential user to provide credentials. The potential user may be asked to provide the user's private key or the location of the user's private key 1604. The policy module may issue a challenge to the potential user, such as asking user for a password or biometric scan. In a preferred embodiment, the potential user is already logged in, so the challenge to the user is transparent to the user. To the potential user, it appears that the files he/she has access to are already unencrypted. The challenges can be based on stored user credentials in the active session (based on a prior challenge to the user, such as the user logging on to their computer). The challenge also can be to a device in use by the user (the device could be a token or the user's computer). In certain embodiments, a challenge may be issued by the policy module to a potential user that is a device to perform a function consistent with a characteristic of the device, such as if the device is purporting to be a graphical user interface, the challenge may be to respond to the presentation of a CAPTCHA. In other embodiments, the policy module may issue a challenge that evaluates the behavior of a potential user that is a device for a pattern that is consistent with the nature of the device. For example, policy module may check to see if input purportedly input to a keyboard by a potential user is actually being passed to the policy module in a manner consistent with human input and the input is not being received at speeds unattainable by a human user.

In certain embodiments, the potential user's private key may be stored locally within the policy module and the policy module may query the potential user with a challenge. For example, the policy module may ask the potential user to input the user's credentials such as the user's name and password. If the proper credentials are provided to the policy module, the policy module can then have access to the user's private key. The policy module then retrieves the user's private key 1605. If the user's credentials are invalid or the policy module cannot retrieve the user's private key, then the policy module generates a report indicating that access is denied 1606. If the private key is properly retrieved, the policy module tests the private key against each HACL file to determine if the private key decrypts one or more of the HACL files. This heuristic methodology determines if the potential user is an authorized user and thus, provides access control only to the files that the potential user is authorized to read. The encrypted HACL file contains the symmetric key for one or more of the files that are stored on the uncontrolled device for which the user is authorized to read 1607. Once the HACL file has been decrypted, the symmetric key is used to decrypt one or more of the files that the user has authorization to access 1608. The policy module determines if the symmetric key is decrypted correctly and is not corrupted 1610. If the answer is "no" than access is denied. An error message may be generated and forwarded to the potential user through the operating system indicating that the user does not have authorization to access the requested file or that the file has been corrupted 1609. In other embodiments, a report of the denied access is sent to a system administrator or may be sent to a file for all reported denials of access. If the file decrypts correctly and therefore the answer is "yes" 1610, then the policy module will return the decrypted file to the operating system in response to the read command and the file will be accessible to the potential user who is now an authorized user 1611.

Figure 18A:
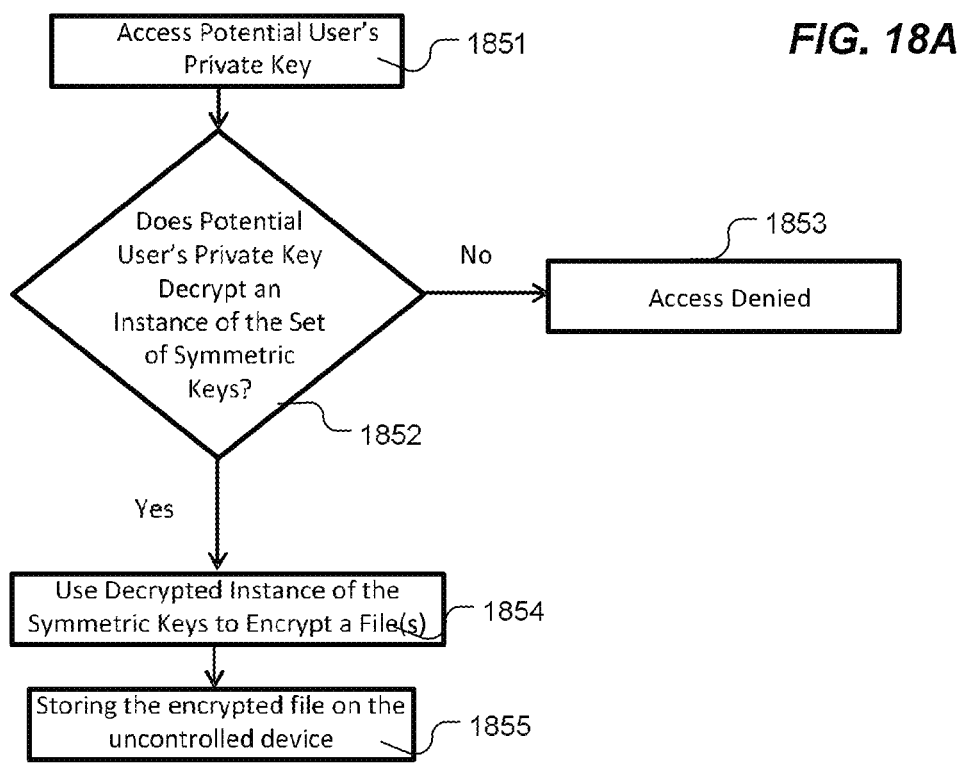
FIG. 18A is an exemplary flow chart in accordance with one embodiment of the invention showing the actions performed by the policy module when a write request is received for writing to an uncontrolled device.
Figure 18B:
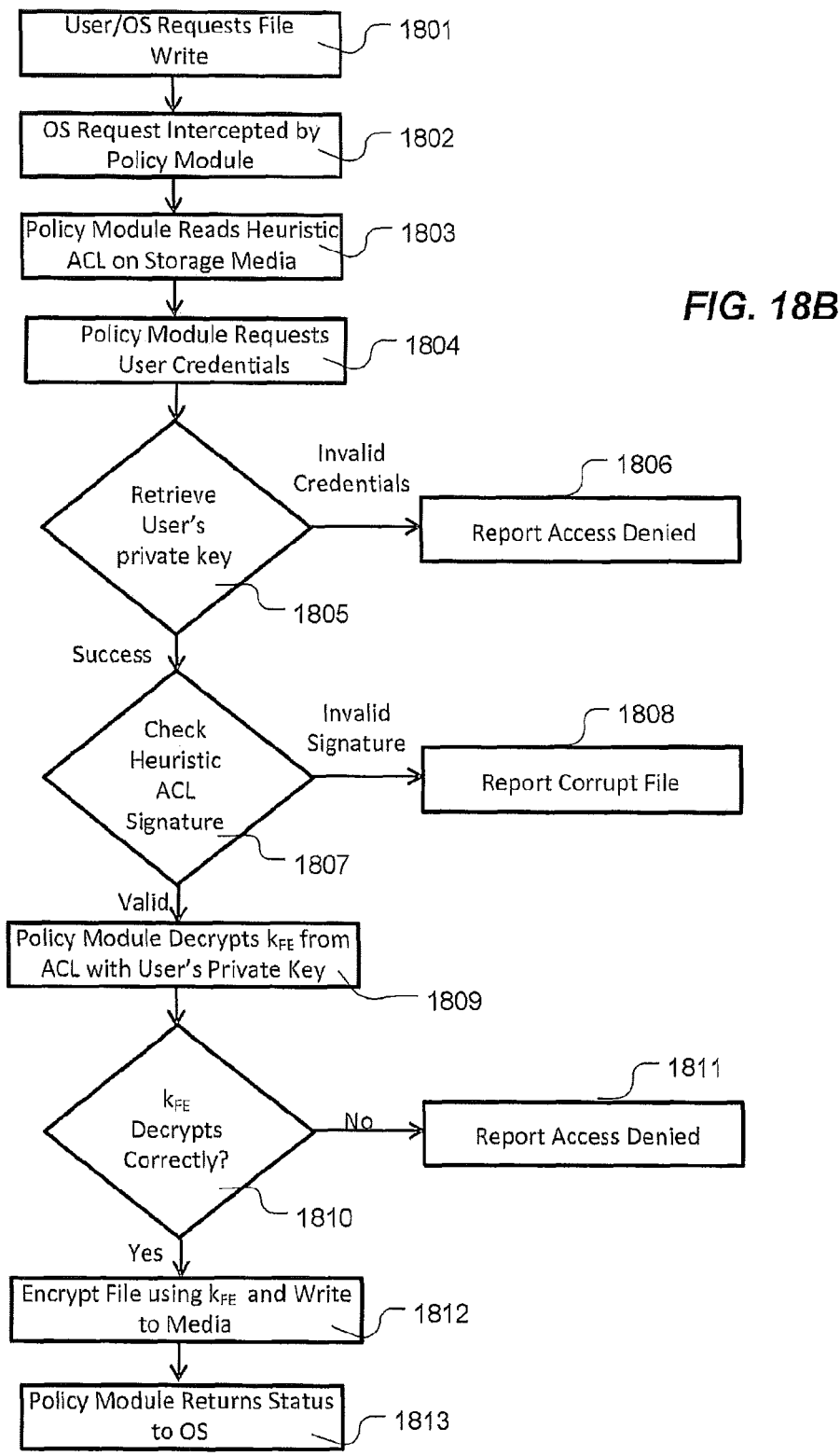
FIG. 18B is flow chart in accordance with another embodiment of the invention showing the interoperation between the policy module and an uncontrolled device when a request for writing a file from a computer to an uncontrolled device is received by an operating system request on a computer.

FIGS. 18A and 18B are flow charts of embodiments of the invention for writing files to an uncontrolled device that contains at least one heuristic access control list in encrypted form.

FIG. 18A provides a flow chart of the operations performed by the policy module in response to receiving a request to write a file to an uncontrolled device that contains an encrypted heuristic access control list containing a set of encrypted symmetric keys. The policy module first gains access to the potential user's private key 1851. The policy module then tests the private key against one or more instances of the HACL that is stored on the uncontrolled device to determine if the potential user's private key decrypts an instance of the set of symmetric keys 1852. If the private key does not decrypt an instance of the set of symmetric keys, write access is denied 1853. The denial of access need not be reported to the potential user. However, in certain embodiments of the invention, the policy module will generate a report indicating that access has been denied and this report can be provided to the potential user and may also be provided to administrators of the network. The report about the denial of access may also be stored in a database. If the potential user's private key decrypts at least one instance of the set of symmetric keys, then one of the decrypted symmetric keys is used to encrypt the file requested by the potential user, who is now confirmed as an authorized user 1854. The policy module then causes the encrypted file to be stored on the uncontrolled device.

In FIG. 18B, a potential user or operating system of a computer or networked device requests to write a file to the uncontrolled device (e.g. portable harddrive, or other portable storage media, USB device, personal laptop etc.) that has been connected to the computer or networked device 1801. The operating system's request to write is intercepted by the policy module 1802. This interception is done in a manner as described above using a trusted hypervisor. The policy module then reads the HACL that is stored on the uncontrolled device 1803. The policy module then requests the potential user's credentials including at least the potential user's private key 1804. The potential user's credentials are either sent by the user and retrieved by the policy module or a link to the location from which the user's private key can be obtained are provided to the policy module. The policy module then retrieves the potential user's private key 1805. If the retrieved private key is inherently incorrect, the policy module will indicate that the credentials of the potential user are invalid and will deny access. A report may be generated and sent to the operating system and presented to the potential user indicating that access has been denied 1806. The denial of access need not be reported to the potential user. In other embodiments, a report may be sent by the policy module to a system administrator or sent to a file or database indicating that access has been denied. In an optional step, if the HACL has been signed, the policy module then checks the HACLs signature for authenticity 1807. If the signature is incorrect after testing the signature, the file is reported as being corrupt 1808. This report may be transmitted to the operating system and reported to the user that the HACL has been tampered with or may be sent to a system administrator or separate file or database. If the signature is found to be valid, then the policy module will use the potential user's private key to decrypt the symmetric keys associated with the potential user's private key. This same optional methodology of checking the digital signature of the HACL file may also be applied to the read process of FIG. 16.

The policy module will test the private key against each HACL stored on the uncontrolled device. The uncontrolled device may have a plurality of HACLs and stored on the uncontrolled device and the policy module will check to see if the potential user is an authorized user of more than one heuristic access control list (HACL). If the potential user is listed on more than one HACL list, the policy module prompts the potential user to select which HACL the user wishes to use. The policy module will decrypt the symmetric keys that are stored in the appropriate HACL list using the user's private key 1809. The symmetric key is then used to check by the policy module to see if the symmetric key decrypts correctly 1810. This can be achieved in a number of ways as known to those of ordinary skill in the art. If the answer is "yes" then the policy allows the now authorized user to encrypt a file using the same symmetric key 1812 and have the file passed to the operating system of the computer that can then store the encrypted file on the uncontrolled device 1813. If the symmetric key does not work correctly, then a report is generated that indicates that access has been denied 1811. This report may be provided to the user requesting write access and the report may be stored and transmitted to one or more other locations or addresses to produce a security log or notify system administrators.

Managing Identity Using Active Directory Certificate Authority and Active Directory Domain Controller:

The identity of both the policy module users as well as the policy module devices themselves are federated by leveraging industry standard tools such as Microsoft AD CA and the Trusted Hardware Module (THM) integrated into the policy module device.

This federated identity structure then ties in to the Access Control List architecture discussed above.

Therefore, while the ACL discussion above focused on the method of enforcement of policies through the use of cryptographic and/or heuristic challenges of data and of the USB devices themselves, this section (Managing identity using AD CA and AD DC) focuses on the method of management of policies.

There are two stages of identity management:
1) Identity of computers and policy modules
2) Identity of users, user groups, and user access permissions Identifying Computers and Policy Modules The first stage of identity pertains to the authentication of devices that may be connected to the enterprise network. In particular, when a policy module is connected to a host computer, the policy module first verifies that the host has a valid certificate with respect to the installed certificate authority. The host then verifies that the policy module similarly has a valid certificate with respect to its installed certificate authority.

The host computer and Policy module both use standard CSR (Certificate Signing Request) protocols to receive certificates from the local AD CA. In these cases, the administrator would likely want to set up an intermediate CA specifically for policy module hardware and software devices and hosts. This CA would then have a specific policy set up by the administrator with respect to the processing of certificate signing requests. Depending on the size of the organization, these might be hand-reviewed by an administrator prior to completion.

In a simple use case, this CA would be the CA for both the policy module and host devices. However, this need not be the case. If an organization already has an existing PKI integrated with host THMs (i.e. hard certs), then this CA may be installed on the policy module and used to authenticate hosts. This CA may be separate from the CA used to authenticate the policy module devices.

Identifying Users, Groups, and Permissions

The second stage of identity pertains to the authentication of users and user environments that then are used to determine access to data on flash drives. In particular, there exists a centralized service that (a) receives and processes flash drive provisioning requests and (b) pushes user access permission updates.

In the provisioning case, a Heuristic Access Control List (HACL) must be generated using data in the Active Directory Domain Controller. Specifically, the administrator creates a group of users within the Domain Controller, the group having the property that it reflects access permissions on flash drives. When a new flash drive is connected to the network, the policy module detects this by a lack of authenticated HACLs present of the flash drive, and a provisioning request is sent to a management server, which uses AD to identify the above group and obtain the public keys for all users in this group. The session key is generated by the server, and is then encrypted under each public key as a set of HACL files, and then coalesced into a single HACL. This HACL is signed by the server and returned to the policy module to be written to the flash drive. Note that more than one HACL may be resident on a single flash drive. Multiple HACLs may be provisioned simultaneously depending on how the server is configured.

This HACL is used as discussed in the section above to identify those users with permissions to access data.

If the user access policy is updated (e.g. adding/removing users and/or their permissions), this data is then used to generate a new HACL that is then pushed to the flash drives. This would occur when an administrator updates permissions in the AD DC. The policy module server, recognizing this change in permissions, would re-provision each drive automatically by re-generating HACLs.

To allow data to be transferred into the secure facility from outside, there are two possible scenarios:
1) Providing a computer with write-only permissions (only given the computer a public key under which data may be encrypted, and a private key under which data would be signed)
2) Providing a computer with the ability to read un-encrypted data on the secure network by modifying the permissions within the policy module device itself.

In certain embodiments of the invention, the ACL's may be signed along with expiration dates, which would result in policy modules and hosts periodically pulling new ACL's from the server. In addition, the session key may be updated with the new ACL. In some embodiments, the old session key (but not the old ACL) is kept encrypted under the new session key. Periodically, the data should be re-encrypted on the drive to remove the old session keys.

Multi-Level Multi-Compartmented Access Control for Data on Removable Media:

The challenge is to enable granular user access to data within a secure network in a dynamic way—being able to add/remove users. This capability exists for many network-attached services, such as file sharing. The use of Active Directory in combination with access control software enables such granular control of these data on file sharing servers. However, such control does not exist for data on any removable media as discussed above. This poses a significant risk for the breach of network-level access control.

As described above, the policy module provides advanced key management that is integrated with the central certificate authority to provide granular multi-level, multi-tiered access control for data on removable media. The solution uses encryption and authentication to prevent data from moving across the defined boundaries. The end result therefore is that the removable media attain the same level of security and control as existing file sharing services. Moreover, due to the hardware component of encryption, there is a separation of privilege between the provisioning and management of access control. Therefore, even an insider with administrative privileges cannot bypass the security of policy module.

Two-Factor Authentication with Hard Cert:

It is known that single-factor, soft cert (such as username/password) authentication is insecure and poses a significant risk to secure networks. The integrated root of trust and cryptographic capabilities of policy module provide several capabilities to improve the security of federated identity systems and add multi-factor authentication. The policy module itself may be bound to an individual user's identity, and the internal root of trust may be used to attest to the user's possession of the policy module during the user authentication sequence.

Moreover, since the policy module may be integrated within the PKI of the secure network, it may be used to issue tokenized short-lifetime temporary certificates that are bound to a removable media. This removable media may then be used temporarily as an additional login credential. No actionable information is leaked due to the tokenization of the certificate. The certificate uses hardcoded information of the removable media to prevent copying. Finally, the certificate has a short lifetime, so loss/theft of the token no longer poses a large risk to the security of the network.

Using "hardcoded information" to prevent copying is an exemplary embodiment. In other cases, the certificate is not bound to the removable media and it can be copied. For example, in environments using a distributed network of servers with a distributed database of certificates, each time a user uses the certificate to log in, the certificate is slightly changed and a state on a corresponding server is also changed (e.g., using a block chain or authenticated ledger). So, if the certificate is copied and someone else tries to use it, the branch (meaning use of the certificate by two parties) can be detected by the server. In this example, there may be a log of each attempt to log in using the certificate. In some cases, the distributed database may be a block chain. In another example, instead of certificates being temporary, certificate lifetime can be extended since each time a user logs in the certificate changes slightly. In an example, instead of or in addition to the certificate expiring at a defined interval, the user is required to log in using the certificate at a defined interval such that the certificate changes.

The policy module may also be used to prevent insider threats. In this embodiment, the authentication scheme leverages Active Directory Certificate Authority (AD CA). In particular, each host computer or server in a Sensitive Compartmented Information Facility (SCIF) such as a business network or enterprise network as well as each policy module will have its own unique public/private key pair and each is certified by AD CA. This certificate is leveraged for cryptographic authentication. By integrating with AD CA, not only can the policy module integrate with an existing PKI(Public Key Infrastructure) (using either the Root CA or an Intermediate CA as the policy module's signing authority), it can also leverage existing AD DC (Domain Controller) policies referencing the circumstances under which a CSR (Certificate Signing Request) is processed. Depending on deployment, the administrator may opt to remain in the loop for all signing requests, or may use any of AD DC or AD CA's integrated functionality to automatically sign/reject CSRs.

When an uncontrolled device (e.g. a flashdrive) is brought into a SCIF, it will not work unless it is connected through an authenticated policy module to an authenticated SCIF host computer. The policy module acts as a USB firewall that prevents attacks and malicious files from reaching the host computer and SCIF secure network.

When a user with permissions to access a SCIF host computer transfers data to the flashdrive, it will be seamlessly encrypted using AES-256. The encrypted data on this flashdrive can seamlessly be read using any other authenticated policy module and authenticated SCIF host computer. However, the data will be encrypted and unreadable if removed from the SCIF. Even in an insider threat scenario where a user with permission to the SCIF takes the flashdrive and/or the hardware-based policy module out of the SCIF, the user will not be able to read the data.

The above-described embodiment, can prevent malicious data from entering the secured network through a USB flask drive. Even if a malicious file is copied to a USB flash drive by an adversary and the USB flash drive is taken across the "air-gap" and connected to the SCIF computers or server, the policy module prevents the malicious file from entering the secure isolated network.

In another scenario, a user on a SCIF computer writes data to a USB flash drive using the policy module. The USB flash drive is later connected to an adversary computer. The encrypted data cannot be read by the adversary computer because the data is encrypted.

In another example, an IT administrator uses a USB hard drive to back-up data on a secure isolated network. The administrator takes the USB hard drive and/or the hardware policy module out of the SCIF. The administrator is still unable to read the encrypted data.

An adversary obtains a policy module device. The adversary is unable to write files using the policy module device because the adversary does not have user permissions to the SCIF and is not working on an authenticated SCIF host computer.

Federated user identity and group-level permissions derived from Active Directory are supported by the policy module as discussed above, and these user access permissions are managed by the policy module. In addition, rather than whole disk encryption, some embodiments support granular file-level permissions. This embodiment enables enhanced cryptographic protection because unique session keys can be generated for each USB device and for each user group. These session keys are encrypted as discussed in the access control enforcement section. This granularity enables a robust infrastructure because the security of the rest of the system is not reduced even if one or more key is compromised. Such granularity offers specific benefits in terms of the data transfer among secure isolated networks and unclassified networks. For example, the embodiment supports the use case of having data from an unclassified network being securely transferred to a classified network, such as mission planning data or maps. At the same time, data encrypted on the secure network cannot be decrypted on the unclassified network, even using a policy module device.

Embodiments include leveraging Microsoft Active Directory CA or Identity Manager or other systems, such as those that use RSA-2048 & SHA. Data-at-rest encryption can include an embodiment that uses XTS-AES (256 bit) (NIST 800-38E and IEEE 1619-2007), Authenticated with SHA-256 (extensible to SHA-3).

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method of protecting, from a security threat, a computer-driven system having a processor host running an operating system in communication over a network with a plurality of electronic devices, wherein a set of protocols governs communications over the network between the processor and the devices, the method utilizing computer processes comprising:

receiving from the operating system, the operating system running in a virtualized environment, a driver call made to a specific driver, the driver call being generated by the operating system in response to a system call made by an application;

interrupting transmission of the driver call to the specific driver; and after receiving the driver call, in a series of paravirtualization processes, translating the driver call into a hyper call;

analyzing the hyper call according to a set of security rules to determine if a security threat exists;

if the analyzing does not determine that a security threat exists, then transmitting the hyper call to the specific driver; and if the analyzing determines that a security threat exists, then performing a security process.

2. A computer-implemented method according to claim 1, wherein performing the security process includes precluding the transmitting of the hyper call to the specific driver.

3. A computer-implemented method according to claim 1, wherein performing the security process includes modifying the hyper call before transmitting the hyper call to the specific driver.

4. A computer-implemented method according to claim 1, wherein performing the security process includes generating a security threat notice.

5. A computer-implemented method according to claim 1, wherein analyzing the hyper call identifies that data is to be written to removable media and performing the security process includes encrypting the data.

6. A computer-implemented security system for use with a host processor having an operating system receiving a specific driver call from an application, the security system comprising:

an analysis module, coupled to a hypervisor and running on the host processor in a first virtualized environment separate from the operating system, the operating system running in a second virtualized environment, the analysis module having:

an input for receiving, from a hypervisor, an input hyper call resulting from a driver call, made to a specific driver, that has been received by the hypervisor, the driver call being generated by the operating system in response to a system call made by an application;

computer code defining a computer process that, after receiving the hyper call, analyzes the hyper call according to a set of security rules to determine if a security threat exists; and an output;

a security module, in the first virtualized environment, having an input coupled to the analysis module output and an output coupled to the hypervisor, configured:

if the analysis module does not determine that a security threat exists, to transmit the hyper call to the hypervisor to cause generation by the hypervisor of an output hyper call responsive to the input hyper call and directed to the specific driver;

if the analysis module determines that a security threat exists, to perform a security process.

7. A computer-implemented security system according to claim 6, wherein the specific driver resides within the first virtualized environment.

8. A computer-implemented security system according to claim 6, wherein the specific driver resides within a third virtualized environment.

9. A computer-implemented security system according to claim 6, wherein the input hyper call is identical to the output hyper call.

10. A computer-implemented security system according to claim 6, wherein the security module includes storage of an encryption key and the security process involves encryption of data to be written to removable media.

11. A nontransitory computer readable medium encoded with instructions, which when executed by a host processor of a computer-driven system, the host processor running an operating system in communication over a network with a plurality of electronic devices, wherein a set of protocols governs communications over the network between the processor and the devices, establishes a method of protecting, from a security threat, the computer-driven system, the method utilizing computer processes comprising:

receiving from the operating system, the operating system running in a virtualized environment, a driver call made to a specific driver, the driver call being generated by the operating system in response to a system call made by an application;

interrupting transmission of the driver call to the specific driver; and after receiving the driver call, in a series of paravirtualization processes, translating the driver call into a hyper call;

analyzing the hyper call according to a set of security rules to determine if a security threat exists;

if the analyzing does not determine that a security threat exists, then transmitting the hyper call to the specific driver; and if the analyzing determines that a security threat exists, then performing a security process.

12. A nontransitory computer readable medium according to claim 11, wherein performing the security process includes precluding the transmitting of the hyper call to the specific driver.

13. A nontransitory computer readable medium according to claim 11, wherein performing the security process includes modifying the hyper call before transmitting the hyper call to the specific driver.

14. A nontransitory computer readable medium according to claim 11, wherein performing the security process includes generating a security threat notice.

15. A nontransitory computer readable medium according to claim 11, wherein the analysis of the hyper call identifies that data is to be written to removable media and the security process includes encrypting the data.

* * * * *